(12) United States Patent
Ogawa

(10) Patent No.: US 12,158,381 B2
(45) Date of Patent: Dec. 3, 2024

(54) FORCE SENSOR AND ROBOT INCLUDING SAME

(71) Applicant: CANON KABUSHIKI KAISHA, Tokyo (JP)

(72) Inventor: Naoya Ogawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 282 days.

(21) Appl. No.: 17/735,718

(22) Filed: May 3, 2022

(65) Prior Publication Data

US 2022/0364938 A1    Nov. 17, 2022

(30) Foreign Application Priority Data

May 11, 2021   (JP) ................................ 2021-080612

(51) Int. Cl.
*G01L 1/04*      (2006.01)
*B25J 13/08*     (2006.01)

(52) U.S. Cl.
CPC .............. *G01L 1/04* (2013.01); *B25J 13/085* (2013.01)

(58) Field of Classification Search
CPC . G01L 1/04; G01L 1/142; G01L 5/169; G01L 1/12; G01L 1/26; G01L 5/16; G01L 5/165; G01L 5/166; G01L 5/226; B25J 13/085
See application file for complete search history.

(56) References Cited

U.S. PATENT DOCUMENTS

| | | | |
|---|---|---|---|
| 10,571,346 B2 * | 2/2020 | Okada | G01L 3/106 |
| 11,761,831 B2 * | 9/2023 | Okada | G01L 5/1627 73/774 |
| 2011/0005338 A1 * | 1/2011 | Okada | G01L 5/0061 73/862.043 |
| 2019/0113407 A1 * | 4/2019 | Okada | G01L 5/166 |
| 2019/0212215 A1 | 7/2019 | Okada | |
| 2020/0238537 A1 * | 7/2020 | Nagura | G01L 5/226 |
| 2024/0077372 A1 * | 3/2024 | Nagura | G01L 5/169 |

FOREIGN PATENT DOCUMENTS

JP   2019074421 A  * 5/2019
WO  WO-2019078314 A1 * 4/2019 .............. B25J 19/02

* cited by examiner

*Primary Examiner* — Octavia Hollington
(74) *Attorney, Agent, or Firm* — Canon U.S.A., Inc. IP Division

(57) ABSTRACT

A force sensor includes a strain body including a base portion, a displacement portion configured to make a displacement relative to the base portion under external force, and an elastic connection portion configured to elastically connect the base portion and the displacement portion, a board including a detection unit configured to detect the displacement of the displacement portion relative to the base portion in a first direction, and an interposed member interposed between the strain body and the board, the interposed member including an extending portion extending in a second direction intersecting a surface of the board and the first direction.

17 Claims, 19 Drawing Sheets

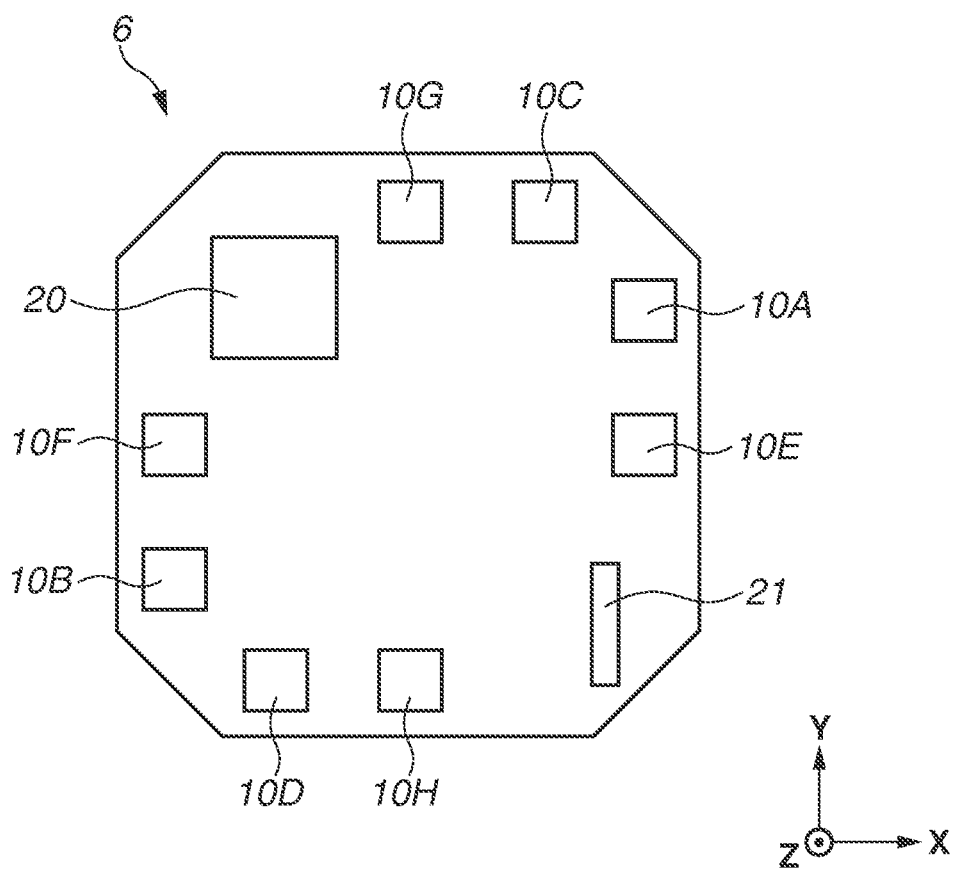

FORCE SENSOR AND ROBOT INCLUDING SAME

BACKGROUND OF THE INVENTION

Field of the Invention

The present invention relates to a force sensor and a robot including the same.

Description of the Related Art

Force sensors are used as a tool for detecting multiaxial external force components acting on various parts of industrial robot arms and medical manipulators. Such force sensors have had an issue of changes in output (detection value) with temperature changes.

Japanese Patent Application Laid-Open No. 2019-074421 discusses inclusion of six-axis external force components and two-axis thermal expansion components into output calculation to make the output (detection value) less susceptible to temperature changes. Here, the six-axis external force components refer to an external force Fx in the X-axis direction, an external force Fy in the Y-axis direction, an external force Fz in the Z-axis direction, a moment Mx about the X-axis, a moment My about the Y-axis, and a moment Mz about the Z-axis. The two-axis thermal expansion components refer to a thermal expansion component Tx in the X-axis direction and a thermal expansion component Ty in the Y-axis direction.

The force sensor discussed in the foregoing Japanese Patent Application Laid-Open No. 2019-074421 reduces the effect of thermal expansion in directions parallel to the mounting surface (XY plane) of the sensor board. However, the effect of complicated thermal stress (and resulting non-uniform distortion of the board) due to thermal expansion, occurring at a location where the sensor board is fixed to the casing, is unable to be reduced. Among changes in output (detection value) due to temperature changes, a change in output (detection value) due to thermal stress therefore still has been unable to be reduced.

SUMMARY OF THE INVENTION

According to an aspect of the present invention, a force sensor includes a strain body including a base portion, a displacement portion configured to make a displacement relative to the base portion under external force, and an elastic connection portion configured to elastically connect the base portion and the displacement portion, a board including a detection unit configured to detect the displacement of the displacement portion relative to the base portion in a first direction, and an interposed member interposed between the strain body and the board, the interposed member including an extending portion extending in a second direction intersecting a surface of the board and the first direction.

Further features of the present invention will become apparent from the following description of embodiments with reference to the attached drawings.

BRIEF DESCRIPTION OF THE DRAWINGS

FIG. 3 is a plan view illustrating a circuit board (board) included in the force sensor of FIGS. 2A to 2C.

DESCRIPTION OF THE EMBODIMENTS

Figure 1:
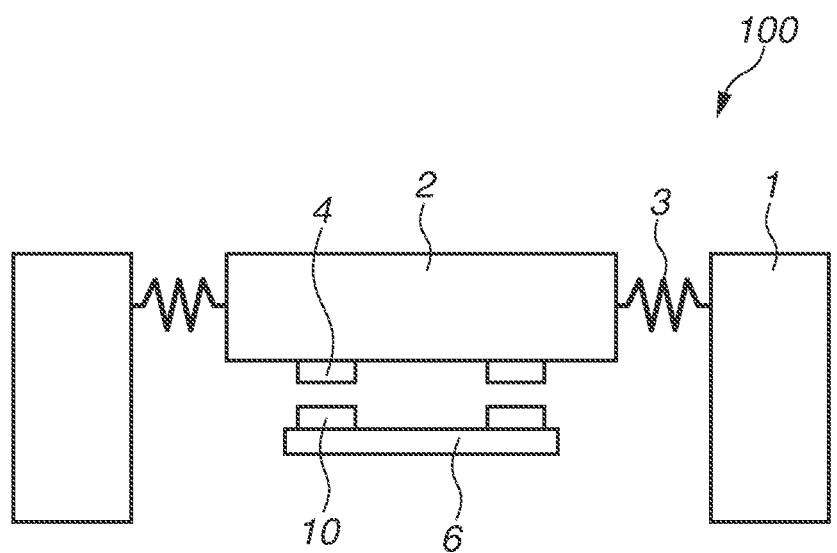
FIG. 1 is a conceptual diagram illustrating a force sensor.

Some embodiments of the present invention will be described in detail below with reference to the attached drawings. FIG. 1 is a conceptual diagram illustrating a force sensor 100. The force sensor 100 detects input (applied) external force and outputs a signal corresponding to the external force. The force sensor 100 includes an outer ring portion 1 (base portion), an inner ring portion 2 (displacement portion), elastic support portions 3 (hereinafter, referred to as "elastic connection portions"), detection targets 4, displacement detectors 10 (detection units), and a circuit board 6 (board).

The elastic connection portions 3 are intended to elastically connect members. The elastic connection portions 3 have a shape and a material that are selected to allow elastic deformation due to external force acting on between the outer ring portion 1 (base portion) and the inner ring portion 2 (displacement portion). The elasticity of the elastic connection portions 3 is appropriately designed based on the range of external force to be detected. More specifically, to detect small external force, the elasticity is designed to be high (the elastic modulus (modulus of elasticity) to be low) to facilitate deformation. To detect large external force or increase mechanical rigidity, the elasticity is designed to be low (the elastic modulus to be high).

Figure 2A:
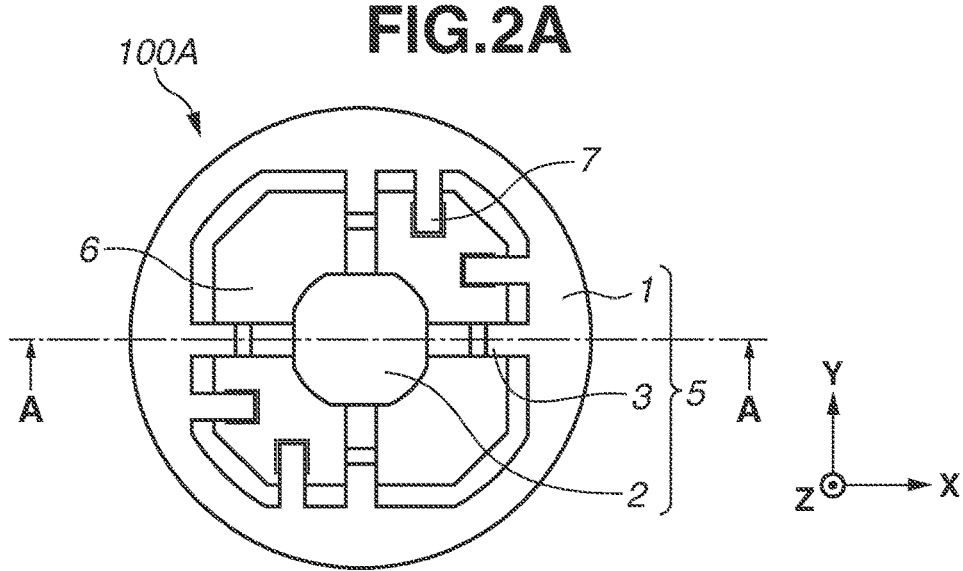
FIG. 2A is a perspective view illustrating a schematic configuration of a force sensor as seen from above.
Figure 2B:
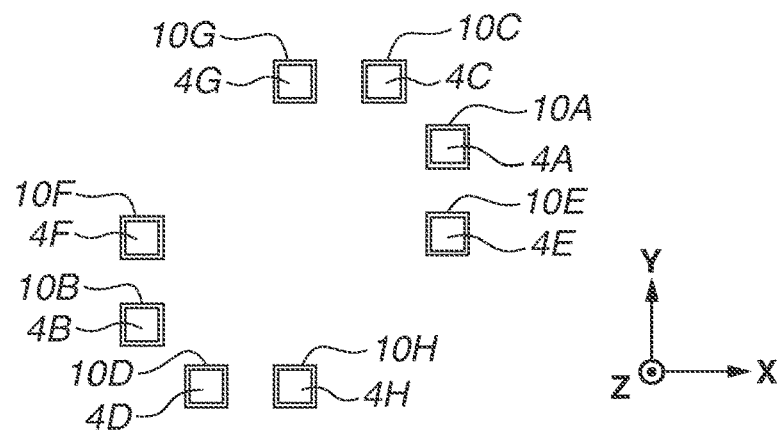
FIG. 2B is a layout diagram of detection targets and displacement detectors (detection units).
Figure 2C:
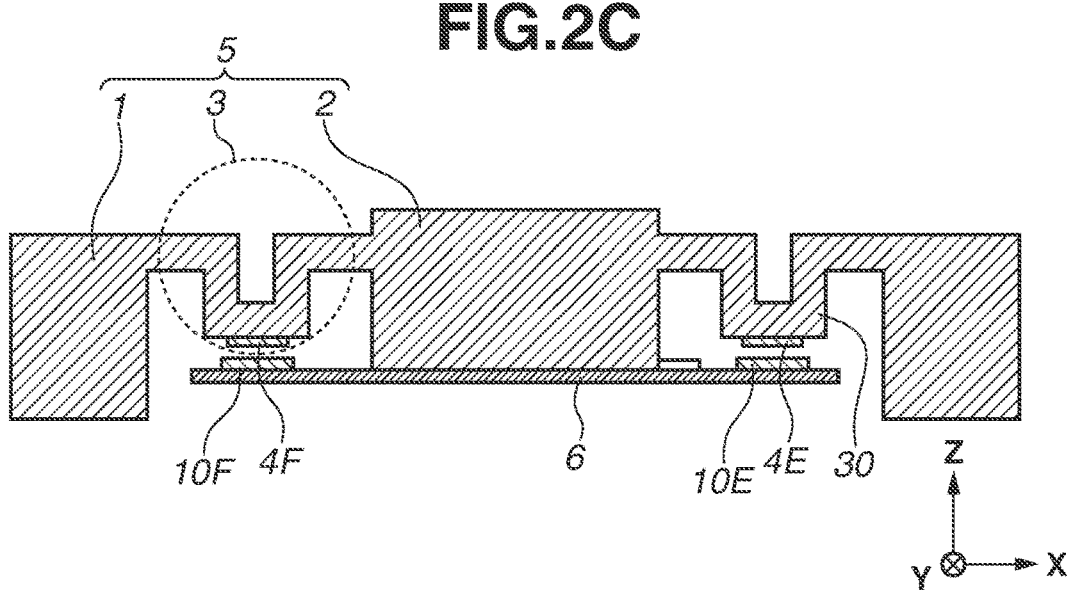
FIG. 2C is a sectional view of the force sensor.

FIG. 2A is a perspective view illustrating a schematic configuration of a force sensor 100A as seen from above. FIG. 2B illustrates detection targets 4A, 4B, 4C, 4D, 4E, 4F, 4G, and 4H and displacement detectors 10A, 10B, 10C, 10D, 10E, 10F, 10G, and 10H (detection units) among the components of the force sensor 100A. FIG. 2C is a sectional view illustrating the schematic configuration of the force sensor 100A, taken along the line A-A illustrated in FIG. 2A.

The force sensor 100A includes a strain body 5, the detection targets 4A, 4B, 4C, 4D, 4E, 4F, 4G, and 4H, a circuit board 6 (board), and the displacement detectors 10A, 10B, 10C, 10D, 10E, 10F, 10G, and 10H (detection units).

The strain body 5 includes an outer ring portion 1 (base portion), an inner ring portion 2 (displacement portion), and elastic connection portions 3. The strain body 5 is a member that causes strain under external force. Application of force to the strain body 5 strains the strain body 5. The strain body 5 includes detection target holding portions 7 that hold the detection targets 4A, 4B, 4C, and 4D.

For convenience of description, an X-axis, a Y-axis, and a Z-axis intersecting one another, or desirably orthogonal to one another, will be defined as illustrated in FIGS. 2A to 2C and used in description as appropriate.

The inner ring portion 2 (displacement portion) and the outer ring portion 1 (base portion) of the force sensor 100A are connected with four elastic connection portions 3 that are radially arranged at intervals of 90° as seen from above. The circuit board 6 (board) is fixed to the inner ring portion 2 (displacement portion). The detection target holding portions 7 that hold the detection targets 4A, 4B, 4C, and 4D are located on the inner peripheral side of the outer ring portion 1 (base portion). The detection targets 4A, 4B, 4C, and 4D are fixed to surfaces of the detection target holding portions 7 opposed to the circuit board 6 (board). For example, the detection targets 4A, 4B, 4C, and 4D are grid-patterned reflection films of chromium on glass bases.

In the force sensor 100A, the elastic connection portions 3 have a displacement direction converting function. The displacement direction converting function is used with U-shaped recessed portions 30. One detection target is fixed to the end surface (surface opposed to the circuit board 6) of each of four recessed portions 30, whereby the detection targets 4E, 4F, 4G, and 4H are disposed. The detection targets 4A, 4B, 4C, 4D, 4E, 4F, 4G, and 4H are located at substantially the same heights in the Z direction (i.e., within the same plane).

FIG. 3 is a plan view of the circuit board 6 (board) included in the force sensor 100A. The displacement detectors 10A, 10B, 10C, 10D, 10E, 10F, 10G, and 10H (detection units) are mounted on the circuit board 6 (board) opposed to the detection targets 4A, 4B, 4C, 4D, 4E, 4F, 4G, and 4H in the Z direction. The displacement detectors 10A and 10B (detection units) are away from each other by a predetermined distance in both the X and Y directions, and located symmetrically about the center of the XY surface of the force sensor 100A. Displacement detection directions of the displacement detectors 10A and 10B (detection units) are the X direction. Similarly, the displacement detectors 10C and 10D (detection units) are away from each other by a predetermined distance in both the X and Y directions, and located symmetrically about the center of the XY surface of the force sensor 100A. The displacement detection directions of the displacement detectors 10C and 10D (detection units) are the Y direction.

Suppose that the force sensor 100A (circuit board 6) is divided into four quadrants by two straight lines passing through the center of the XY surface of the force sensor 100A, one parallel to the X axis and the other parallel to the Y axis. The displacement detectors 10A and 10C (detection units) are located in the same quadrant. The displacement detectors 10B and 10D (detection units) are located in the same quadrant.

The quadrant where the displacement detectors 10A and 10C (detection units) are located and the quadrant where the displacement detectors 10B and 10D (detection units) are located are in a positional relationship symmetric about the center of the XY surface of the force sensor 100A. Electric parts such as a signal processing circuit 20 and a connector 21 for outputting signals from the signal processing circuit 20 are mounted on the quadrants where the displacement detectors 10A, 10B, 10C, and 10D (detection units) are not mounted.

Figure 4:
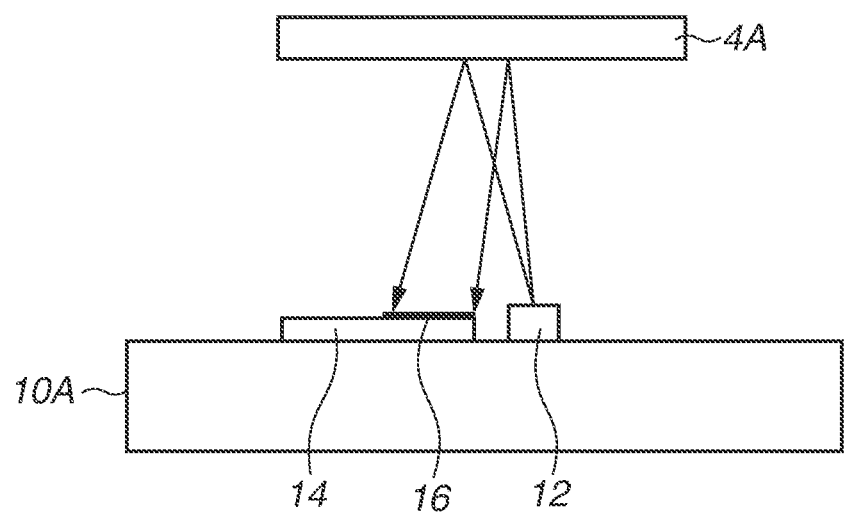
FIG. 4 is a diagram for describing the configuration of a displacement detector (detection unit) and a method of reading a detection target.

FIG. 4 is a diagram for describing a configuration of the displacement detector 10A (detection unit) and a method of reading the detection target 4A by the displacement detector 10A (detection unit).

The configurations of the displacement detectors 10B to 10H (detection units) and the methods of reading the detection targets 4B to 4H by the displacement detectors 10B to 10H (detection units) are similar to the configuration of the displacement detector 10A (detection unit) and the method of reading the detection target 4A by the displacement detector 10A (detection unit). A redundant description thereof will thus be omitted.

The displacement detector 10A (detection unit) is an integrated light transmission-reception sensor unit including a light source 12 and a light reception integrated circuit (IC) 14 packaged together. The light reception IC 14 includes a light receiving device array 16. A current-confined light-emitting diode (LED) or a semiconductor laser can be used as the light source 12. The light receiving device array 16 includes a plurality of light receiving devices (detection elements) for detecting a distribution of light from the pattern of the detection target 4A, the light receiving devices of which are arranged in a moving direction (position measurement direction, first direction) of the detection target 4A.

The displacement detector 10A (detection unit) is opposed to the detection target 4A to detect an amount of relative displacement of the detection target 4A. More specifically, a diverging light beam emitted from the light source 12 is reflected by the grid pattern on the detection target 4A to form a light quantity distribution in a fringe-pattern (interference fringes) on the light receiving device array 16 due to diffraction and interference. The displacement of the detection target 4A from the displacement detector 10A (detection unit) is detected by detecting the movement of the interference fringes. The displacement of the inner ring portion 2 (displacement portion) from the outer ring portion 1 (base portion) is thereby detected.

The displacement detection direction of the displacement detector 10E (detection unit) is the X direction. The displacement detector 10E (detection unit) is located at substantially the same position as that of the displacement detector 10A (detection unit) in the X direction, and at a predetermined distance from the displacement detector 10A (detection unit) in the Y direction. The displacement detection direction of the displacement detector 10F (detection unit) is the X direction. The displacement detector 10F (detection unit) is located at substantially the same position as that of the displacement detector 10B (detection unit) in the X direction, and at a predetermined distance from the displacement detector 10B (detection unit) in the Y direction. The displacement detectors 10E and 10F (detection units) are located on the same straight line parallel to the X-axis.

The displacement detection direction of the displacement detector 10G (detection unit) is the Y direction. The displacement detector 10G (detection unit) is located at substantially the same position as that of the displacement detector 10C (detection unit) in the Y direction, and at a predetermined distance from the displacement detector 10C (detection unit) in the X direction. The displacement detection direction of the displacement detector 10H (detection unit) is the Y direction. The displacement detector 10H (detection unit) is located at substantially the same position as that of the displacement detector 10D (detection unit) in the Y direction, and at a predetermined distance from the displacement detector 10D (detection unit) in the X direction. The displacement detectors 10G and 10H (detection units) are located on the same straight line parallel to the Y-axis.

As described above, the elastic connection portions 3 have the displacement direction converting function. More specifically, the bottoms of the recessed portions 30 of the elastic connection portions 3 are displacement portions that make a displacement from the outer ring portion 1 (base portion) in the X direction or the Y direction as the inner ring portion 2 (displacement portion) is displaced in the Z direction.

Specifically, if an external force Fz in the Z direction is applied to the inner ring portion 2 (displacement portion), the detection target 4E disposed on the elastic connection portion 3 makes a displacement in the −X direction, the detection target 4F the X direction, the detection target 4G the −Y direction, and the detection target 4H the Y direction. If a moment Mx is applied to the inner ring portion 2 (displacement portion), the detection targets 4G and 4H make a displacement in the −Y direction. If a moment My is applied to the inner ring portion 2 (displacement portion), the detection targets 4E and 4F make a displacement in the X direction.

If an external force Fx is applied to the inner ring portion 2 (displacement portion), the circuit board 6 (board) including the displacement detectors 10A, 10B, 10C, 10D, 10E, 10F, 10G, and 10H (detection units) makes a displacement in the X direction along with the inner ring portion 2 (displacement portion). As a result, the displacement detectors 10A and 10B (detection units) detect a relative displacement of the opposed detection targets 4A and 4B in the −X direction, respectively. If an external force Fy is applied to the inner ring portion 2 (displacement portion), the displacement detectors 10C and 10D (detection units) similarly detect a relative displacement of the opposed detection targets 4C and 4D in the −Y direction, respectively. If a moment Mz is applied to the inner ring portion 2 (displacement portion), the displacement detectors 10A, 10B, 10C, and 10D (detection units) similarly detect a relative displacement of the opposed detection targets 4A, 4B, 4C, and 4D in the −X, X, Y, and −Y directions, respectively. From such detection amounts, the external forces Fx, Fy, and Fz, and the moments Mx, My, and Mz can be determined by calculation.

The detection target holding portions 7 may be integrated with the outer ring portion 1 (base portion), or may be separate members.

As the temperature of the force sensor 100A changes, the members expand or contract based on the coefficients of thermal expansion of their respective materials. Suppose, for example, that the strain body 5 is made of an aluminum alloy, and the circuit board 6 (board) a glass epoxy circuit board material. The aluminum alloy has a coefficient of thermal expansion of approximately 23. The glass epoxy circuit board material has a coefficient of thermal expansion of approximately 15 in the horizontal direction of the mounting surface (direction parallel to the XY plane in the diagrams). If the temperature of the force sensor 100A increases, the thermal expansion of the strain body 5 is thus greater than that of the circuit board 6 (board). This causes thermal stress at the junction where the circuit board 6 (board) is fixed to the strain body 5.

To reduce the thermal stress, there is a method of forming the strain body 5 of a material having a coefficient of thermal expansion similar to that of the circuit board 6 (board). That however limits the types of materials for the strain body 5, which leads to difficulty in giving the elastic connection portions 3 desired elasticity and an increased weight.

In the force sensor 100A, the circuit board 6 (board) is fixed to the inner ring portion 2 (displacement portion 2). Such a configuration reduces the amount of relative displacement of the junction due to thermal expansion as compared with the case where the circuit board 6 (board) is fixed to the outer ring portion 1 (base portion). This reduces the resulting thermal stress.

Consequently, deformation of the circuit board 6 (board) different from simple thermal expansion can be reduced. Moreover, that configuration provides a force sensor less susceptible to temperature changes.

The configuration of the force sensor has been described of optically detecting the displacements of the detection targets 4A, 4B, 4C, 4D, 4E, 4F, 4G, and 4H using the displacement detectors 10A, 10B, 10C, 10D, 10E, 10F, 10G, and 10H (detection units). However, the method of displacement detection is not limited to the optical one, and other methods of displacement detection such as magnetic or capacitive methods may be employed. For example, if a magnetic detection method is employed, the detection targets may be magnetic bodies (magnets) with a magnetic polarity distribution similar to the shape of the reflection films of the detection targets 4A to 4H, and an array of magnetic field detection devices may be closely opposed to the detection targets. With such a configuration, displacements of the magnets can be detected by detecting a change in the magnetic fields using the magnetic field detection devices.

If a capacitive detection method is employed, conductive electrode patterns having a similar shape to that of the reflection films of the detection targets 4A to 4H may be formed on the detection targets, and another array of electrode patterns may be closely opposed thereto. With such a configuration, displacements of the detection targets can be detected by detecting a change in the capacitances between the electrode patterns.

An array of detection targets and an array of detectors are not always used. External force can be detected by at least one detection unit and one detection target pattern edge. In such a case, the displacement detection direction is normal to the edge within the detection target plane.

Figure 5A:
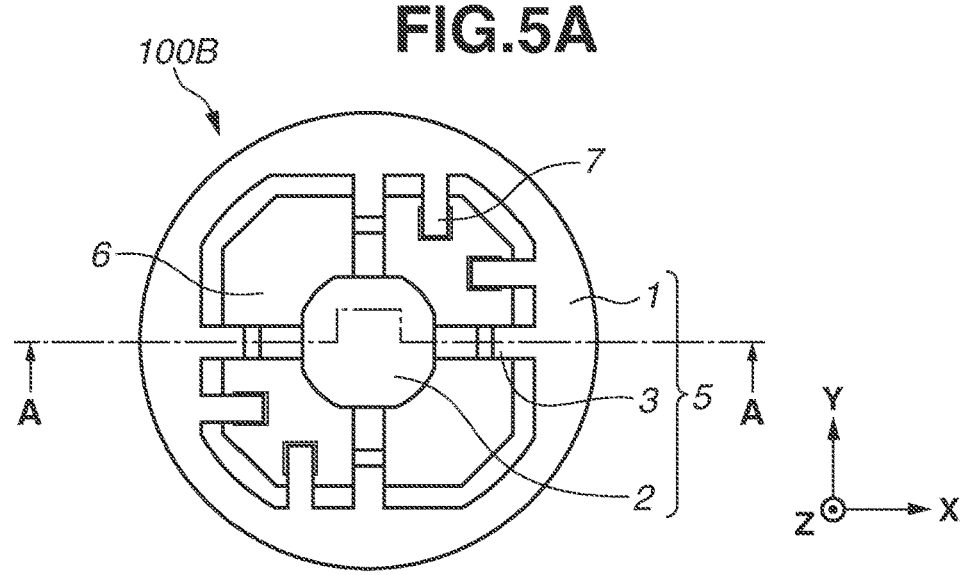
FIGS. 5A and 5B are a perspective view from above and a sectional view, respectively, illustrating a schematic configuration of a force sensor according to a first embodiment.
Figure 5B:
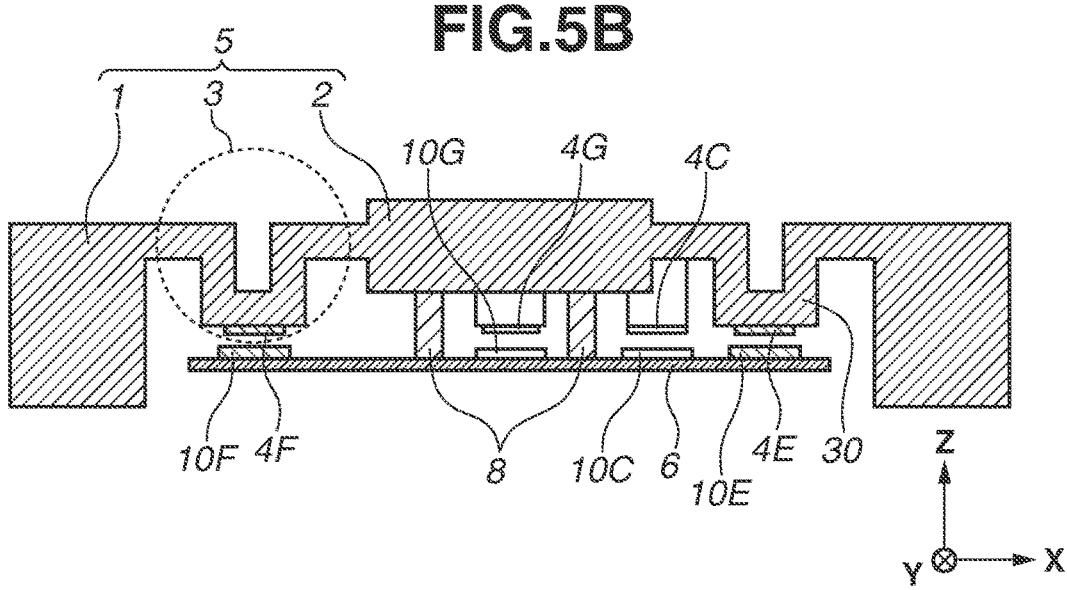
Figure 5C:
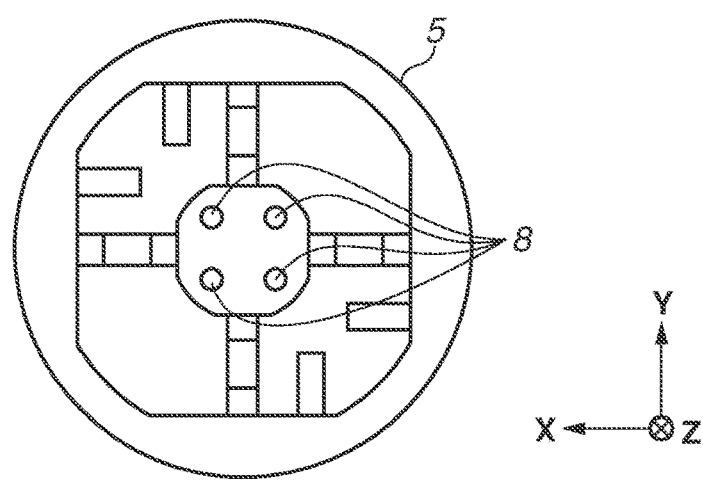
FIG. 5C is a perspective view of a strain body from below.

FIG. 5A is a perspective view illustrating a schematic configuration of a force sensor 100B according to a first embodiment of the invention as seen from above. FIG. 5B is a sectional view of the schematic configuration of the force sensor 100B, taken along the line A-A illustrated in FIG. 5A. FIG. 5C is a perspective view of a strain body 5 of the force sensor 100B as seen from below. Like numbers refer to like components of the force sensor 100A. A redundant description of the components will be omitted.

The force sensor 100B includes the strain body 5, scales 4A, 4B, 4C, 4D, 4E, 4F, 4G, and 4H (detection targets), a circuit board 6 (board), detection target holding portions 7, and displacement detectors 10A, 10B, 10C, 10D, 10E, 10F, 10G, and 10H (detection units). The strain body 5 includes an outer ring portion 1 (base portion), an inner ring portion 2 (displacement portion), elastic connection portions 3, and cylindrical protrusions 8 (extending portions, interposed members). The extending portions have a flat spring structure with a higher modulus of elasticity in a first direction to be described below than in a second direction to be described below.

In the present embodiment, the protrusions 8 (extending portions, interposed members) are integrated with the inner ring portion 2 (displacement portion) and included in the strain body 5. In other embodiments, the protrusions 8 (extending portions, interposed members) are members separate from the inner ring portion 2 (displacement portion).

The protrusions 8 (extending portions, interposed members) are located under the inner ring portion 2 (displacement portion). The circuit board 6 (board) is located under the protrusions 8 (extending portions, interposed members) and fixed to the protrusions 8 (extending portions, interposed members). Here, the protrusions 8 (extending portions, interposed members) extend in a direction (second direction) intersecting the moving directions (position measurement directions, first directions) of the detection targets 4A, 4B, 4C, 4D, 4E, 4F, 4G, and 4H.

Like the above described force sensor, as the temperature of the force sensor 100B changes, thermal stress occurs at the junctions between the circuit board 6 (board) and the protrusions 8 (extending portions, interposed members). However, the protrusions 8 (extending portions, interposed members) deform under thermal stress, reducing the thermal stress occurring at the junctions between the protrusions 8 (extending portions, intermediate members) and the circuit board 6 (board). That results in reduction in deformation of the circuit board 6 (board) different from simple thermal expansion. Moreover, that configuration provides a force sensor less susceptible to temperature changes.

To facilitate deformation under thermal stress, it is suitable that the cylindrical protrusions 8 (extending portions, interposed members) have a greater height in the Z direction than the diameter of their horizontal section.

In the present embodiment, the protrusions 8 (extending portions, interposed members) has been described to have a cylindrical shape. However, in some embodiments, the protrusions 8 (extending portions, interposed members) have other shapes such as a quadrangular prism shape. The protrusions 8 (extending portions, interposed members) may be formed in a shape of their horizontal section varying with height.

Figure 6A:
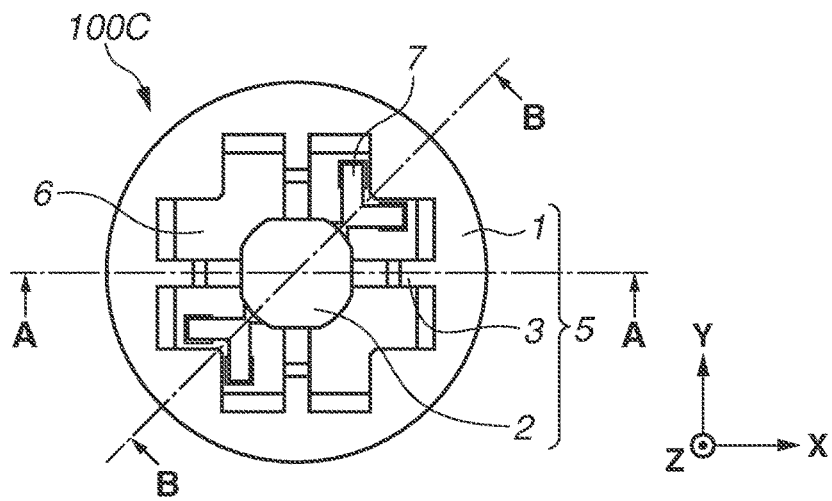
FIG. 6A is a perspective view illustrating a schematic configuration of a force sensor according to a second embodiment as seen from above.
Figure 6B:
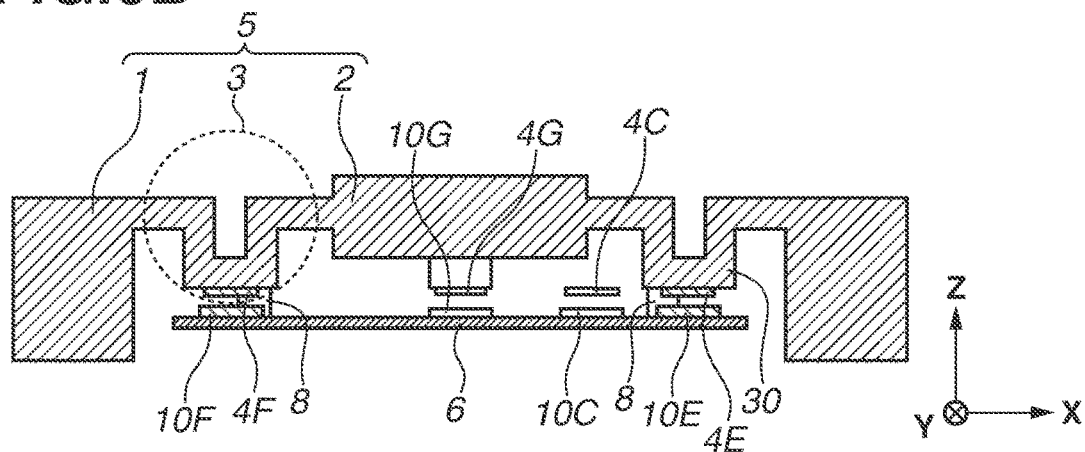
FIGS. 6B and 6C are sectional views of the force sensor.
Figure 6C:
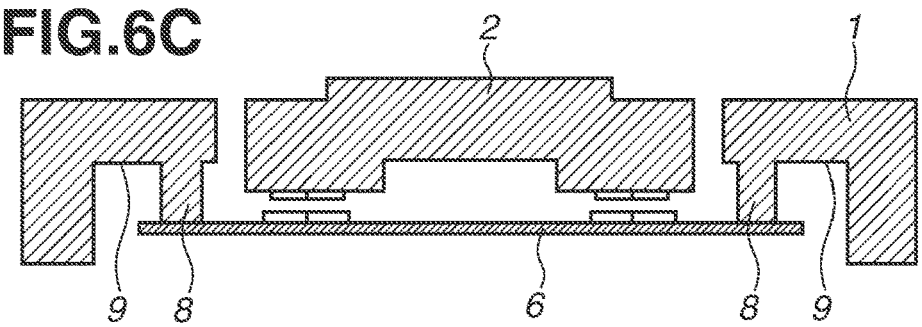
Figure 6D:
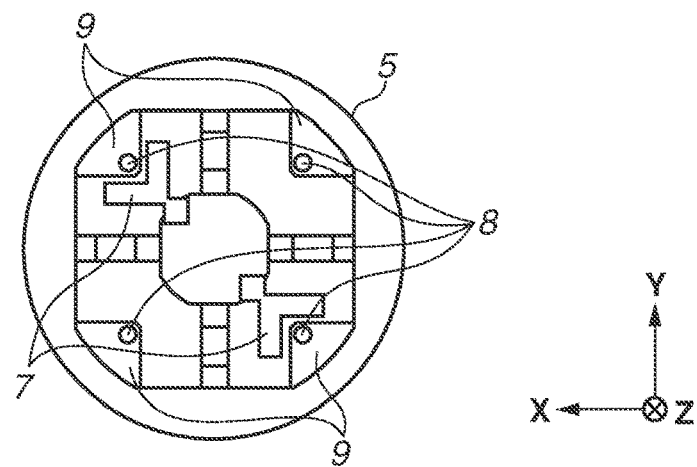
FIG. 6D is a perspective view of a strain body from below.

FIG. 6A is a perspective view illustrating a schematic configuration of a force sensor 100C according to a second embodiment as seen from above. FIG. 6B is a sectional view of the schematic configuration of the force sensor 100C, taken along the line A-A illustrated in FIG. 6A. FIG. 6C is a sectional view of the schematic configuration of the force sensor 100C, taken along the line B-B illustrated in FIG. 6A. FIG. 6D is a perspective view of a strain body 5 of the force sensor 100C as seen from below.

Like numbers refer to like components of the force sensors 100A and 100B. A redundant description of the components will be omitted.

The force sensor 100C includes the strain body 5, scales 4A, 4B, 4C, 4D, 4E, 4F, 4G, and 4H (detection targets), a circuit board 6 (board), detection target holding portions 7, and displacement detectors 10A, 10B, 10C, 10D, 10E, 10F, 10G, and 10H (detection units). The strain body 5 includes an outer ring portion 1 (base portion), an inner ring portion 2 (displacement portion), elastic connection portions 3, and cylindrical protrusions 8 (extending portions, interposed members). The extending portions have a flat spring structure with a higher modulus of elasticity in a first direction to be described below than in a second direction to be described below.

In the present embodiment, the protrusions 8 (extending portions, interposed members) are integrated with the outer ring portion 1 (base portion) and included in the strain body 5. In other embodiments, the protrusions 8 (extending portions, interposed members) are members separate from the outer ring portion 1 (base portion).

The outer ring portion 1 (base portion) includes protrusion holding portions 9 for disposing the protrusions 8 (extending portions, interposed members). The protrusions 8 (extending portions, interposed members) are located under the protrusion holding portions 9. The circuit board 6 (board) is located under the protrusions 8 (extending portions, interposed members) and fixed to the protrusions 8 (extending portions, interposed members). Here, the protrusions 8 (extending portions, interposed members) extend in a direction (second direction) intersecting the moving directions (position measurement directions, first directions) of the detection targets 4A, 4B, 4C, 4D, 4E, 4F, 4G, and 4H.

In the present embodiment (second embodiment), the detection target holding portions 7 are located on the outer periphery of the inner ring portion 2 (displacement portion), and hold the detection targets 4A, 4B, 4C, and 4D. If an external force Fx is applied to the inner ring portion 2 (displacement portion), the detection targets 4A and 4B make a displacement in the X direction. Similarly, if an external force Fy is applied to the inner ring portion 2 (displacement portion), the detection targets 4C and 4D make a displacement in the Y direction. Similarly, if a moment Mz is applied to the inner ring portion 2 (displacement portion), the detection targets 4A, 4B, 4C, and 4D make a displacement in the X, −X, −Y, and Y directions, respectively. The displacements of the detection targets 4E, 4F, 4G, and 4H are similar to those in the example of FIGS. 1 to 4.

From such detection amounts, the external forces Fx, Fy, and Fz, and the moments Mx, My, and Mz can be determined by calculation.

The detection target holding portions 7 may be integrated with the inner ring portion 2 (displacement portion), or may be separate from it.

Like the first embodiment, as the temperature of the force sensor 100C changes, thermal stress occurs at the junctions between the protrusions 8 (extending portions, interposed members) and the circuit board 6 (board). However, the protrusions 8 (extending portions, interposed members) deform under thermal stress, reducing the thermal stress occurring at the junctions between the protrusions 8 (extending portions, intermediate members) and the circuit board 6 (board).

In the second embodiment, the amount of relative displacement due to thermal expansion is greater than in the first embodiment where the protrusions 8 (extending portions, interposed members) are located under the inner ring portion 2 (displacement portion). The effect of reducing the thermal stress at the junctions is thus lower than in the first embodiment. However, the thermal stress at the junctions can be reduced as compared with the case where the circuit board 6 (board) is fixed to the outer ring portion 1 (base portion) without the protrusions 8 (extending portions, interposed members). As a result, deformation of the circuit board 6 (board) different from simple thermal expansion can be reduced. Moreover, that configuration provides a force sensor less susceptible to temperature changes.

Like the first embodiment, to facilitate deformation under thermal stress, it is suitable that the cylindrical protrusions 8 (extending portions, interposed members) have a greater height in the Z direction than the diameter of their horizontal section.

In the present embodiment, the protrusions 8 (extending portions, interposed members) have been described to have a cylindrical shape. However, in some embodiments, the protrusions 8 (extending portions, interposed members) have other shapes such as a quadrangular prism shape. The protrusions 8 (extending portions, interposed members) may be formed in a shape of their horizontal section varying with height.

Figure 7A:
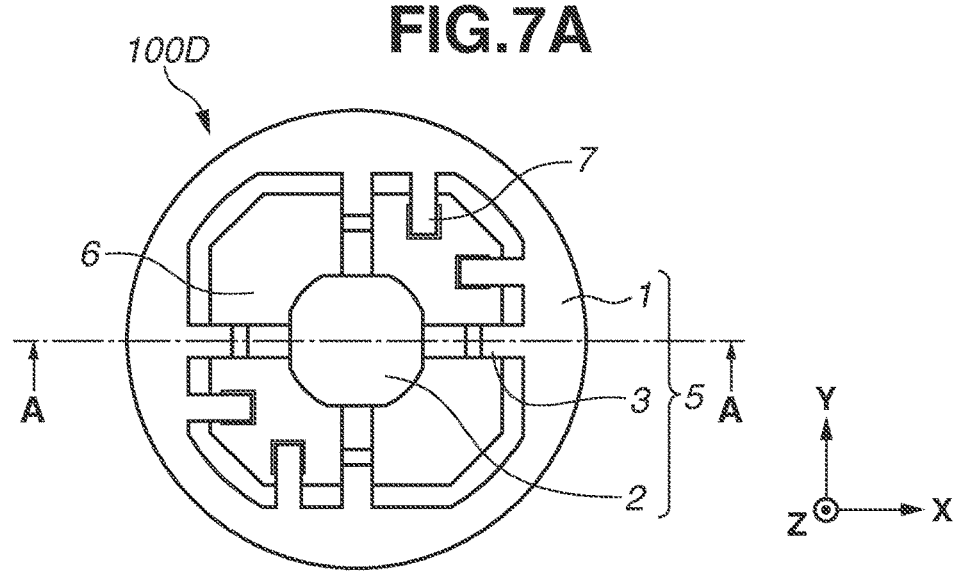
FIGS. 7A and 7B are a perspective view from above and a sectional view, respectively, illustrating a schematic configuration of a force sensor according to a third embodiment.
Figure 7B:
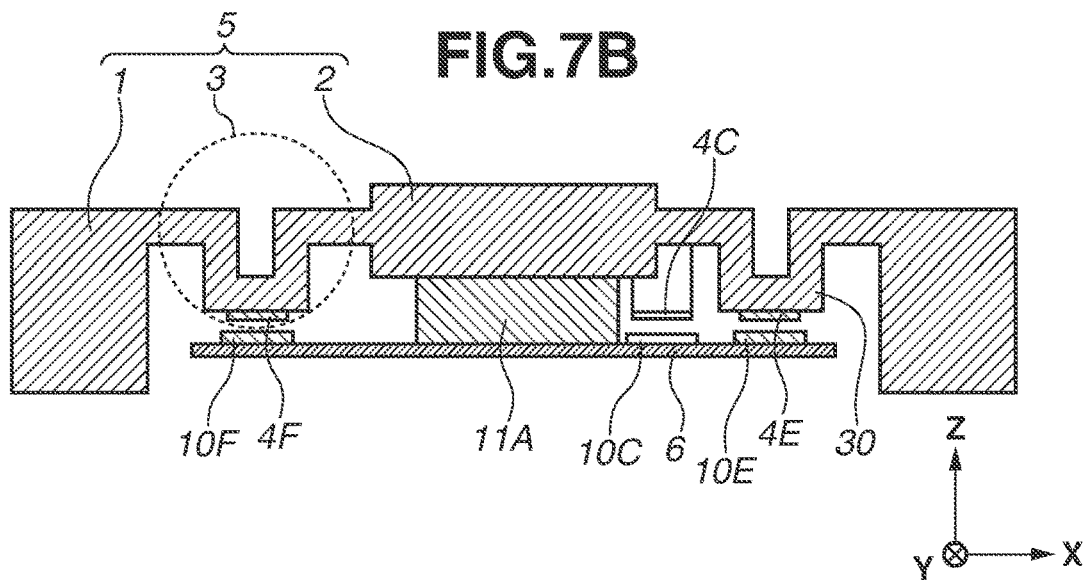
Figure 7C:
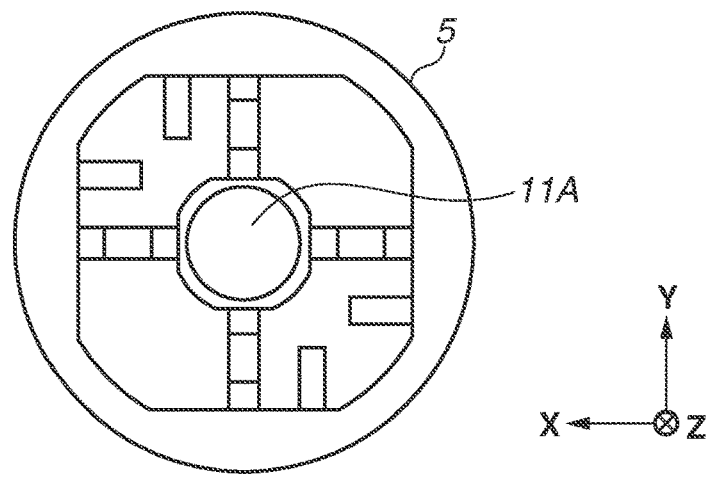
FIG. 7C is a perspective view of a strain body from below.

FIG. 7A is a perspective view illustrating a schematic configuration of a force sensor 100D according to a third embodiment as seen from above. FIG. 7B is a sectional view of the schematic configuration of the force sensor 100D, taken along the line A-A illustrated in FIG. 7A. FIG. 7C is a perspective view of a strain body 5 of the force sensor 100D as seen from below. Like numbers refer to like components of the foregoing force sensors 100A, 100B, and 100C. A redundant description of the components will be omitted.

The force sensor 100D includes the strain body 5, scales 4A to 4H (detection targets), a circuit board 6 (board), detection target holding portions 7, displacement detectors 10A to 10H (detection units), and an intermediate member 11A (extending portion, interposed member). The intermediate member 11A (extending portion, interposed member) itself is an extending portion. The strain body 5 includes an outer ring portion 1 (base portion), an inner ring portion 2 (displacement portion), and elastic connection portions 3.

The intermediate member 11A (extending portion, interposed member) is located under the inner ring portion 2 (displacement portion) and fixed to the inner ring portion 2 (displacement portion). The circuit board 6 (board) is located under the intermediate member 11A (extending portion, interposed member) and fixed to the intermediate member 11A (extending portion, interposed member). Here, the intermediate member 11A (extending portion, interposed member) extends in a direction (second direction) intersecting the moving directions (position measurement directions, first directions) of the detection targets 4A, 4B, 4C, 4D, 4E, 4F, 4G, and 4H.

The intermediate member 11A (extending portion, interposed member) is not limited to any particular material. To reduce the effect of temperature changes on output, it is suitable that the interposed member has a coefficient of thermal expansion less than that of the displacement portion and greater than that of the board. The effect of temperature changes on output can be further reduced by making the intermediate member 11A (interposed member) out of a material with a coefficient of thermal expansion closer to that of the material of the circuit board 6 (board) than to that of the material of the strain body 5 (first member). In other words, it is suitable that the intermediate member 11A (extending portion, interposed member) is made of a material with a coefficient of thermal expansion closer to that of the material of the circuit board 6 (board).

According to the present embodiment (third embodiment), with changes in the temperature of the force sensor 100D, the thermal stress occurring at the junction between the intermediate member 11A (extending portion, interposed member) and the circuit board 6 (board) is smaller than that occurring with the circuit board 6 (board) directly fixed to the strain body 5. That results in reduction in deformation of the circuit board 6 (board) different from simple thermal expansion. Moreover, that configuration provides a force sensor less susceptible to temperature changes.

As for the thermal stress occurring at the junction between the strain body 5 and the intermediate member 11A (extending portion, interposed member), the effect of that thermal stress on the circuit board 6 (board) is small, resulting in a less effect of temperature changes on output.

Figure 8A:
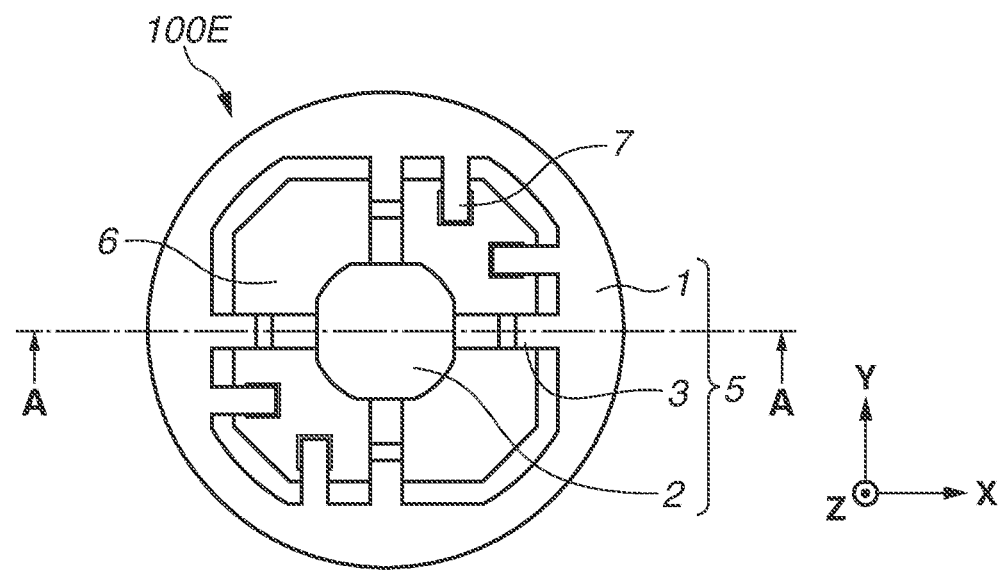
FIGS. 8A and 8B are a perspective view from above and a sectional view, respectively, illustrating a schematic configuration of a force sensor according to a fourth embodiment.
Figure 8B:
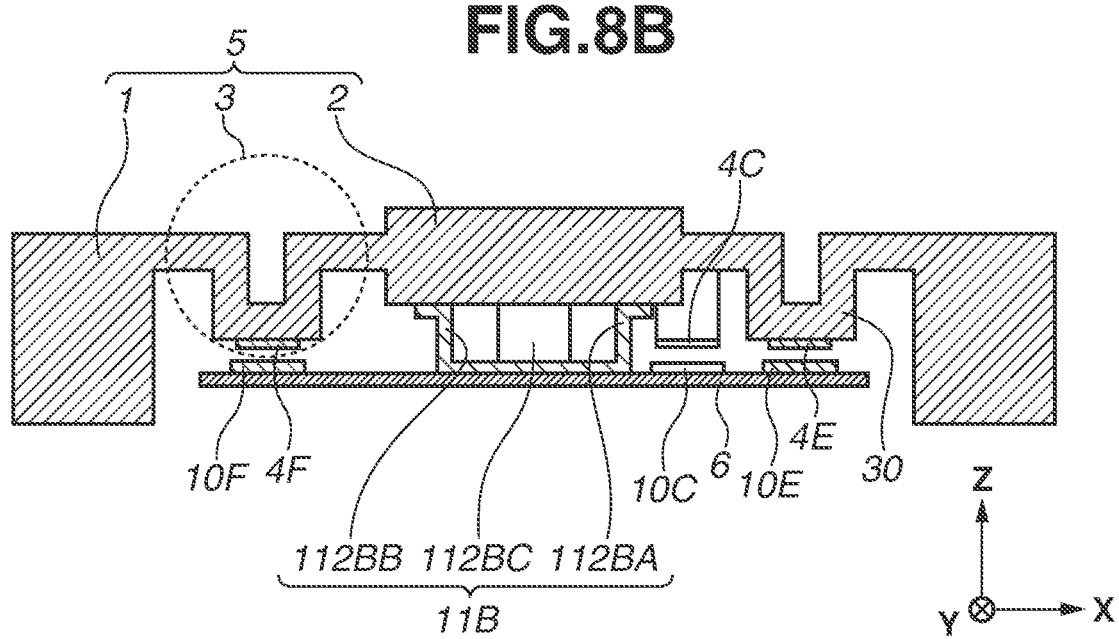

FIG. 8A is a perspective view illustrating a schematic configuration of a force sensor 100E according to a fourth embodiment as seen from above. FIG. 8B is a sectional view of the schematic configuration of the force sensor 100E, taken along the line A-A illustrated in FIG. 8A. The force sensor 100E has a similar configuration to that of the force sensor 100D, but includes an intermediate member 11B (interposed member) configured differently from the intermediate member 11A (extending portion, interposed member).

Figure 9:
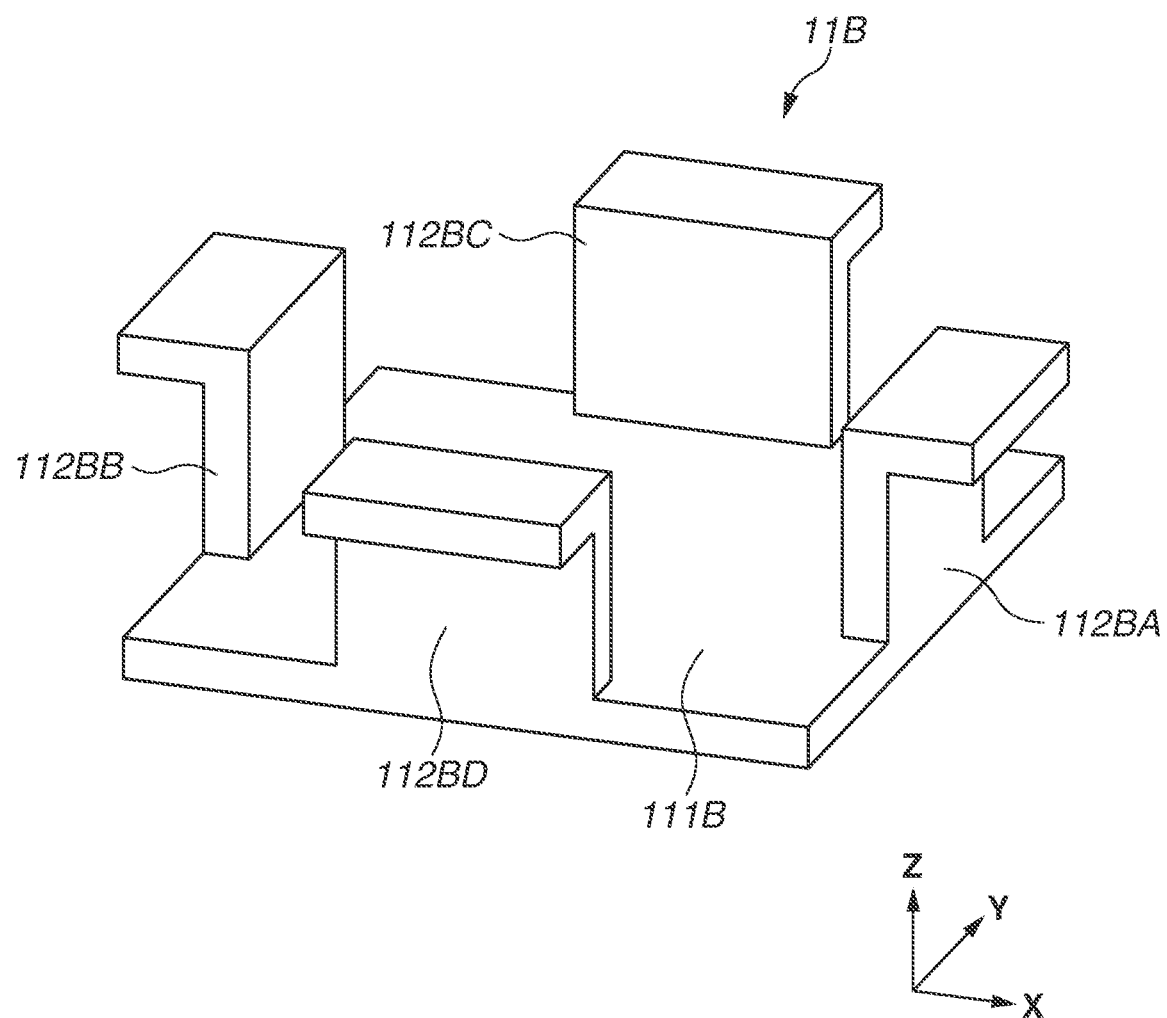
FIG. 9 is a perspective view illustrating an intermediate member (interposed member) according to the fourth embodiment.

FIG. 9 is a perspective view of the intermediate member 11B (interposed member). The intermediate member 11B (interposed member) is not limited to any particular material. To reduce the effect of temperature changes on output, it is suitable that the interposed member has a coefficient of thermal expansion less than that of the displacement portion and greater than that of the board. The effect of temperature changes on output can be further reduced by making the intermediate member 11B (interposed member) out of a material having a coefficient of thermal expansion closer to that of the material of the circuit board 6 (board) than to that of the material of the strain body 5. In other words, it is suitable that the intermediate member 11B (interposed member) is made of a material with a coefficient of thermal expansion closer to that of the material of the circuit board 6 (board).

The intermediate member 11B (interposed member) includes a bottom portion 111B and arm portions 112BA, 112BB, 112BC, and 112BD (extending portions). The extending portions have a flat spring structure with a higher modulus of elasticity in a first direction to be described below than in a second direction to be described below.

The arm portions 112BA, 112BB, 112BC, and 112BD (extending portions) are fixed to one of the inner ring portion 2 (displacement portion) and the circuit board 6 (board). A second surface of the bottom portion 111B to be described below is fixed to the other of the inner ring portion 2 (displacement portion) and the circuit board 6 (board). Here, the circuit board 6 (board) is fixed to the intermediate member 11B (interposed member) at the second surface opposite to a first surface of the bottom portion 111B from which the arm portions 112BA, 112BB, 112BC, and 112BD (extending portions) extend.

The intermediate member 11B (interposed member) is fixed to the inner ring portion 2 (displacement portion) of the strain body 5 at the arm portions 112BA, 112BB, 112BC, and 112BD (extending portions). Here, the arm portions 112BA, 112BB, 112BC, and 112BD (extending portions) extend in a direction (second direction) intersecting the moving directions (position measurement directions, first directions) of the detection targets 4A, 4B, 4C, 4D, 4E, 4F, 4G, and 4H.

The arm portions 112BA, 112BB, 112BC, and 112BD (extending portions) each have a part where the thickness in the radial direction (first direction) is smaller (thinner) than those in two directions orthogonal to the radial direction (with the X direction as the radial direction, the Y and Z directions). Take the arm portion 112BA as an example. The arm portion 112BA has a part where the dimension (thickness) in the X direction in the diagram is smaller (thinner) than those in the Y and Z directions (directions orthogonal to the X direction) in the diagram.

In the present embodiment, thermal stress at the junctions due to a difference between the coefficients of thermal expansion of the intermediate member 11B (interposed member) and the strain body 5 is reduced by deformation of the arm portions 112BA, 112BB, 112BC, and 112BD (extending portions). In addition to that effect, thermal stress at the junction between the intermediate member 11B (interposed member) and the circuit board 6 (board) is reduced for the same reason as in the third embodiment. As a result, the effect of temperature changes on changes in output can be further reduced.

Figure 10A:
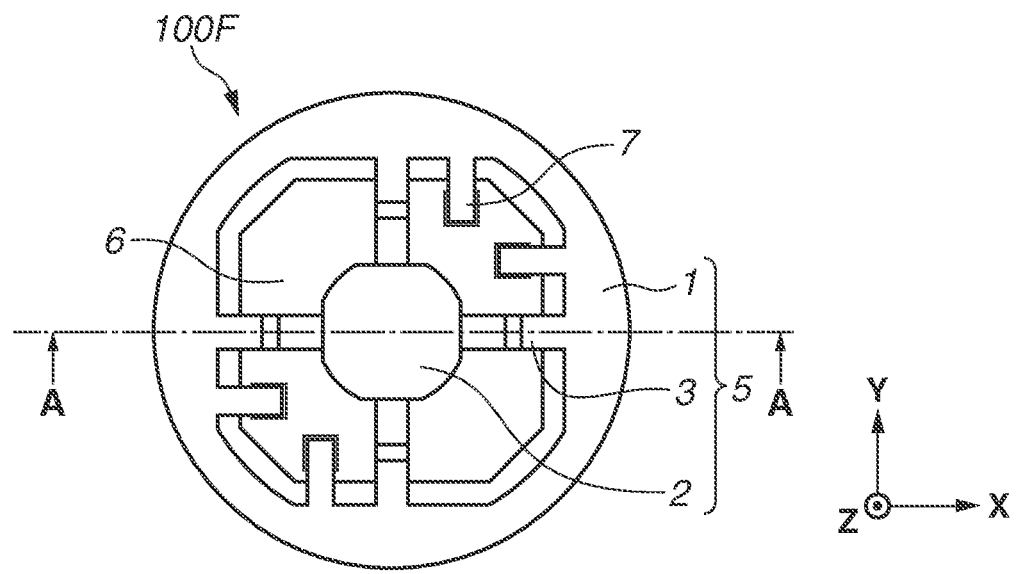
FIGS. 10A and 10B are a perspective view from above and a sectional view, respectively, illustrating a schematic configuration of a force sensor according to a fifth embodiment.
Figure 10B:
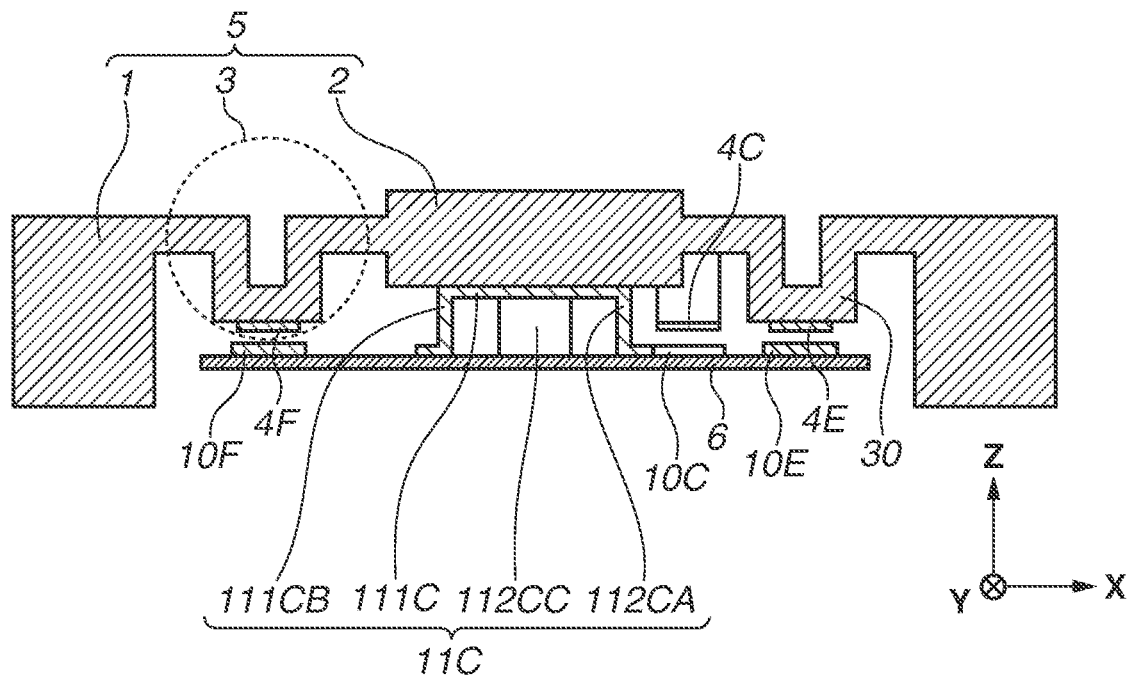
Figure 11:
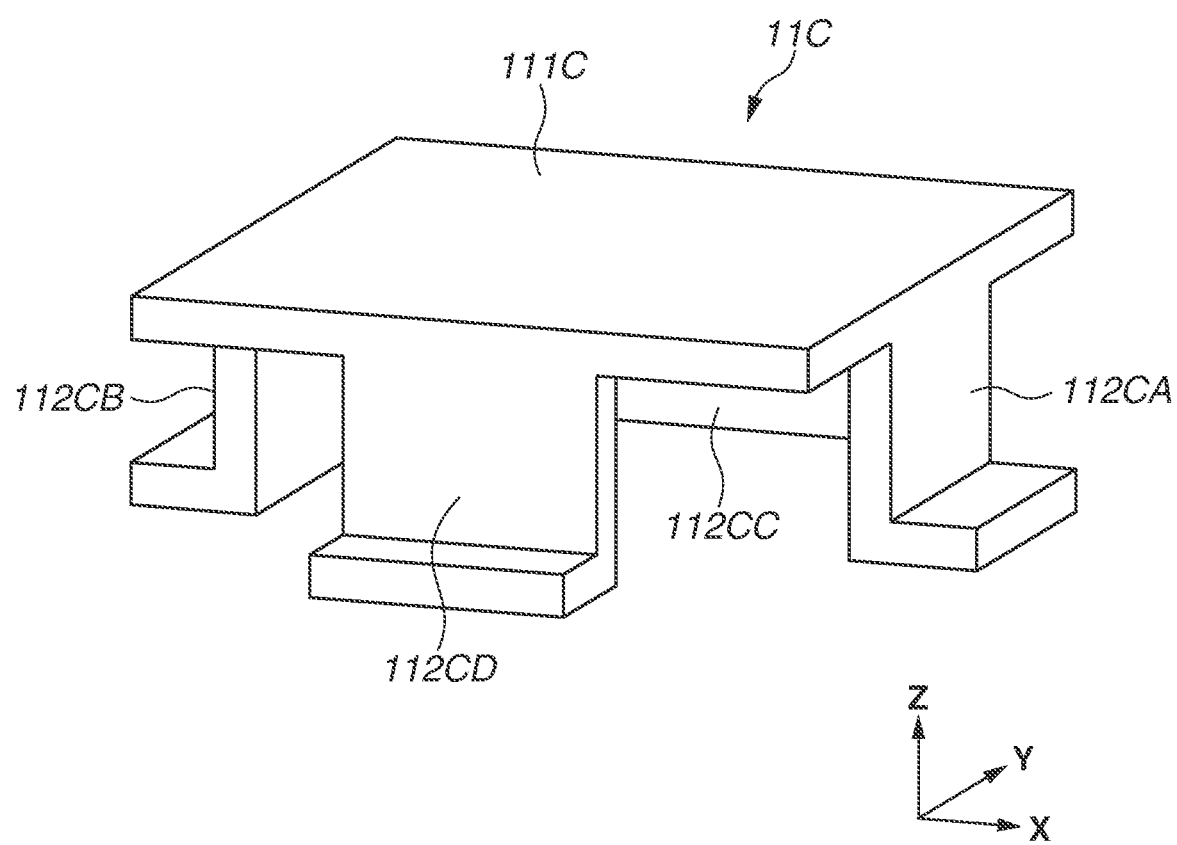
FIG. 11 is a perspective view illustrating an intermediate member (interposed member) according to the fifth embodiment.

FIG. 10A is a perspective view illustrating a schematic configuration of a force sensor 100F according to a fifth embodiment as seen from above. FIG. 10B is a sectional view of the schematic configuration of the force sensor 100F, taken along the line A-A illustrated in FIG. 10A. The force sensor 100F has a substantially similar configuration to that of the force sensors 100D and 100E. However, an intermediate member 11C (interposed member) is configured differently from the intermediate member 11A (extending portion, interposed member) and the intermediate member 11B (interposed member). FIG. 11 is a perspective view of the intermediate member 11C (interposed member).

The intermediate member 11C includes a bottom portion 111C and arm portions 112CA, 112CB, 112CC, and 112CD (extending portions). The extending portions have a flat spring structure with a higher modulus of elasticity in a first direction to be described below than in a second direction to be described below.

The arm portions 112CA, 112CB, 112CC, and 112CD (extending portions) are fixed to one of the inner ring portion 2 (displacement portion) and the circuit board 6 (board). A second surface of the bottom portion 111C to be described below is fixed to the other of the inner ring portion 2 (displacement portion) and the circuit board 6 (board). Here, the circuit board 6 (board) is fixed to the intermediate member 11C (interposed member) at the arm portions 112CA, 112CB, 112CC, and 112CD (extending portions). The intermediate member 11C (interposed member) is fixed to the inner ring portion 2 (displacement portion) of the strain body 5 at the second surface opposite to a first surface of the bottom portion 111C from which the arm portions 112CA, 112CB, 112CC, and 112CD (extending portions) extend. Here, the arm portions 112CA, 112CB, 112CC, and 112CD (extending portions) extend in a direction (second direction) intersecting the moving directions (position measurement directions, first directions) of the detection targets 4A, 4B, 4C, 4D, 4E, 4F, 4G, and 4H.

The arm portions 112CA, 112CB, 112CC, and 112CD (extending portions) each have a part where the thickness in the radial direction (first direction) is smaller (thinner) than those in two directions orthogonal to the radial direction (with the X direction as the radial direction, the Y and Z directions). Take the arm portion 112CA as an example. The arm portion 112CA has a part where the dimension (thickness) in the X direction (first direction) in the diagram is smaller than those in the Y and Z directions (directions orthogonal to the X direction) in the diagram.

In the present embodiment, thermal stress at the junctions due to a difference between the coefficients of thermal expansion of the intermediate member 11C (interposed member) and the circuit board 6 (board) is reduced by deformation of the arm portions 112CA to 112CD (extending portions). That results in reduction in the effect of temperature changes on a change in output.

Figure 12:
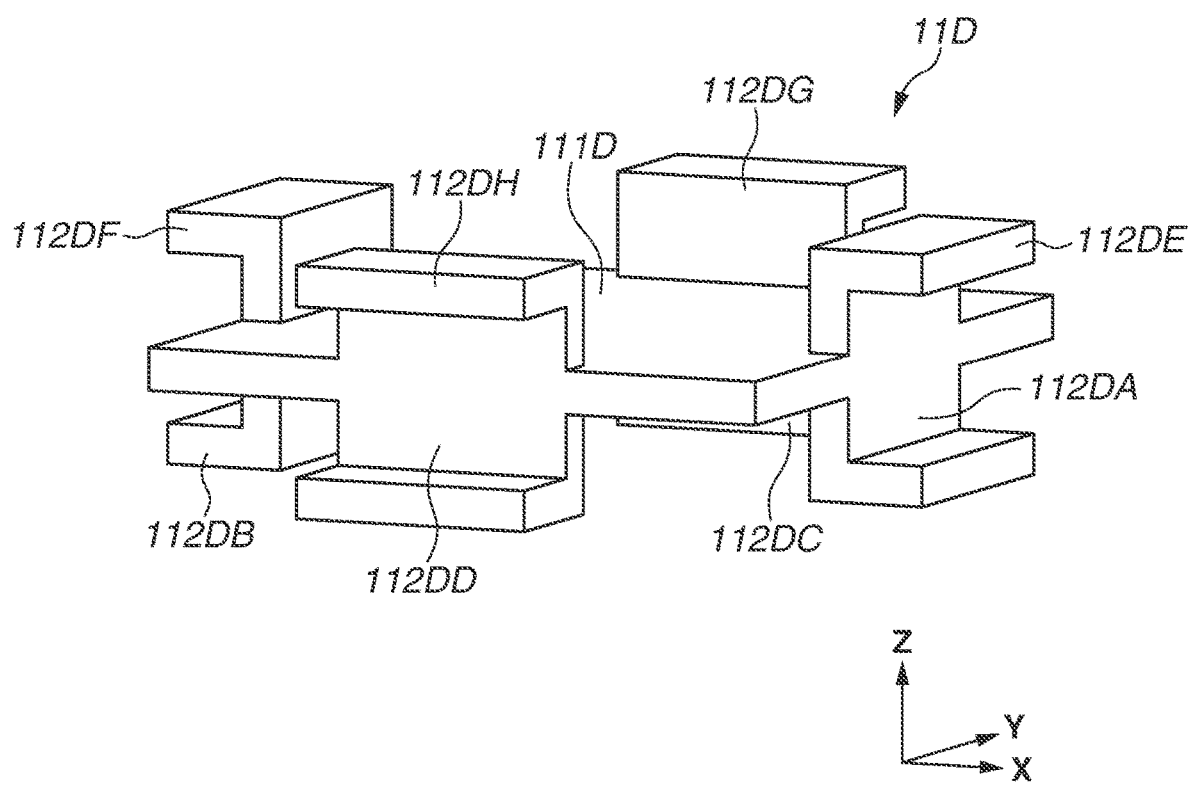
FIG. 12 is a perspective view illustrating another mode of the intermediate member (interposed member) according to the fifth embodiment.

FIG. 12 is a perspective view illustrating an intermediate member 11D (interposed member) as another mode of the intermediate member (interposed member) according to the present embodiment (fifth embodiment).

The intermediate member 11D (interposed member) includes a bottom portion 111D and arm portions 112DA, 112DB, 112DC, 112DD, 112DE, 112DF, 112DG, and 112DH (extending portions). The extending portions have a flat spring structure with a higher modulus of elasticity in a first direction to be described below than in a second direction to be described below.

The arm portions 112DA to 112DD (extending portions) are fixed to one of the inner ring portion 2 (displacement portion) and the circuit board 6 (board). The arm portions 112DE to 112DH (extending portions) are fixed to the other of the inner ring portion 2 (displacement portion) and the circuit board 6 (board). Here, the circuit board 6 (board) is fixed to the intermediate member 11D (interposed member) at the arm portions 112DA, 112DB, 112DC, and 112DD (extending portions). The intermediate member 11D (interposed member) is fixed to the inner ring portion 2 (displacement portion) of the strain body 5 at the arm portions 112DE, 112DF, 112DG, and 112DH (extending portions). Here, the arm portions 112DA, 112DB, 112DC, 112DD, 112DE, 112DF, 112DG, and 112DH (extending portions) extend in a direction (second direction) intersecting the moving directions (position measurement directions, first directions) of the detection targets 4A, 4B, 4C, 4D, 4E, 4F, 4G, and 4H.

In addition to the foregoing effects, thermal stress at the junctions between the strain body 5 and the intermediate member 11D (interposed member) is reduced by deformation of the arm portions 112DE, 112DF, 112DG, and 112DH during a temperature change. That results in reduction in deformation of the circuit board 6 (board) different from simple thermal expansion. Moreover, that configuration reduces the effect of temperature changes on output further.

Figure 13A:
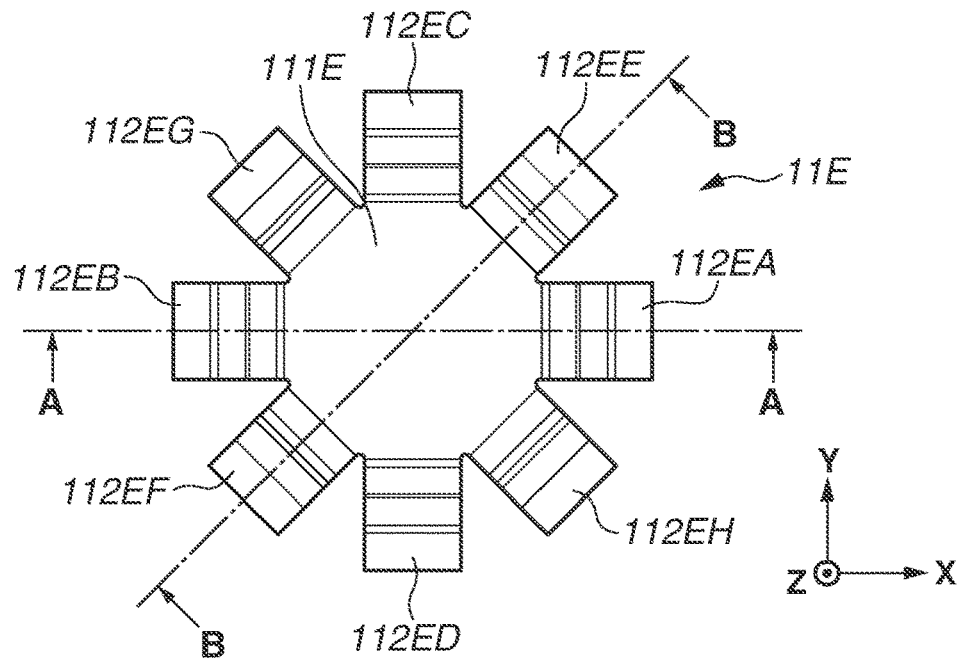
FIG. 13A is a perspective view illustrating yet another mode of the intermediate member (interposed member) according to the fifth embodiment as seen from above.
Figure 13B:
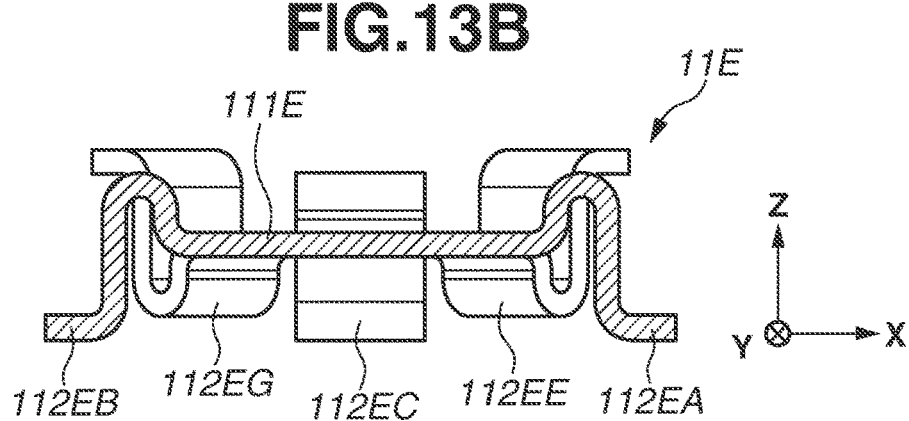
FIGS. 13B and 13C are sectional views of the intermediate member (interposed member).
Figure 13C:
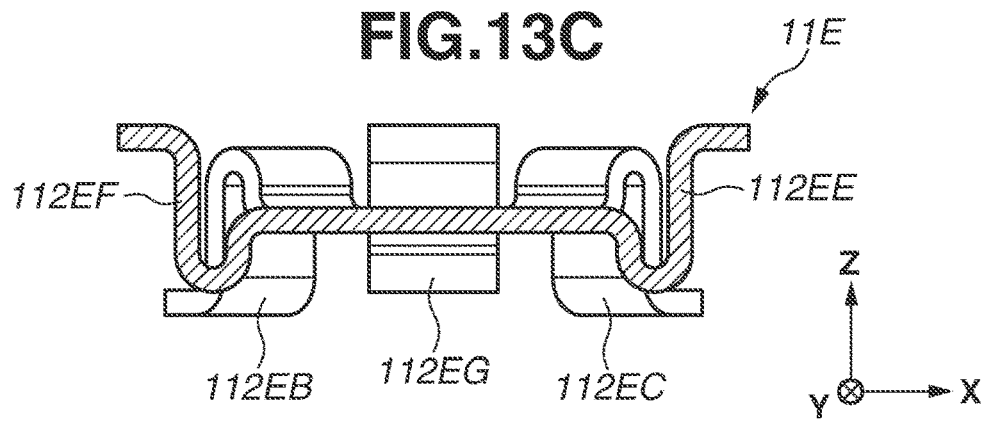

FIGS. 13A, 13B, and 13C are diagrams illustrating an intermediate member 11E (interposed member) as yet another mode of the intermediate member (interposed member) according to the present embodiment. FIG. 13A is a view of the intermediate member 11E (interposed member) from above. FIG. 13B is a sectional view of the intermediate member 11E (interposed member), taken along the line A-A illustrated in FIG. 13A. FIG. 13C is a sectional view of the intermediate member 11E (interposed member), taken along the line B-B illustrated in FIG. 13A. The behavior of the intermediate member 11E (interposed member) and various parts (bottom portion 111E and arm portions 112EA to 112EH) of the intermediate member 11E (interposed member) is similar to that of the intermediate member 11D (interposed member) and various parts (bottom portion 111D and arm portions 112DA to 112DH) of the intermediate member 11D (interposed member). A description thereof will thus be omitted.

The intermediate member (interposed member) described in the present embodiment (fifth embodiment) is not limited to any particular material. To reduce the effect of temperature changes on output, it is suitable that the interposed member has a coefficient of thermal expansion less than that of the displacement portion and greater than that of the board. The effect of temperature changes on the output can be further reduced by making the intermediate member (interposed member) out of a material with a coefficient of thermal expansion closer to that of the material of the circuit board 6 (board) than to that of the material of the strain body 5. In other words, it is suitable that the intermediate member (interposed member) described in the present embodiment (fifth embodiment) is made of a material with a coefficient of thermal expansion closer to that of the material of the circuit board 6 (board).

Figure 14A:
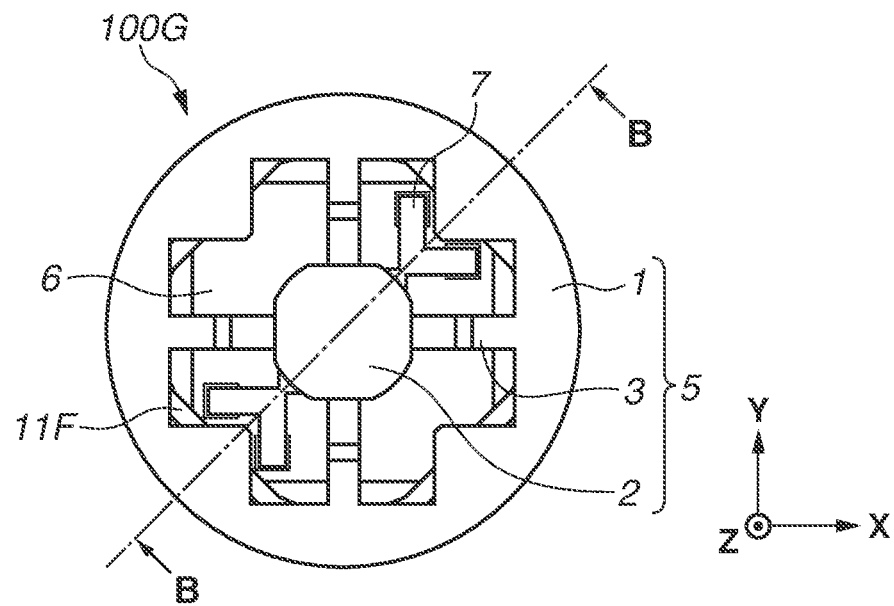
FIGS. 14A and 14B are a perspective view from above and a sectional view, respectively, illustrating a schematic configuration of a force sensor according to a sixth embodiment.
Figure 14B:
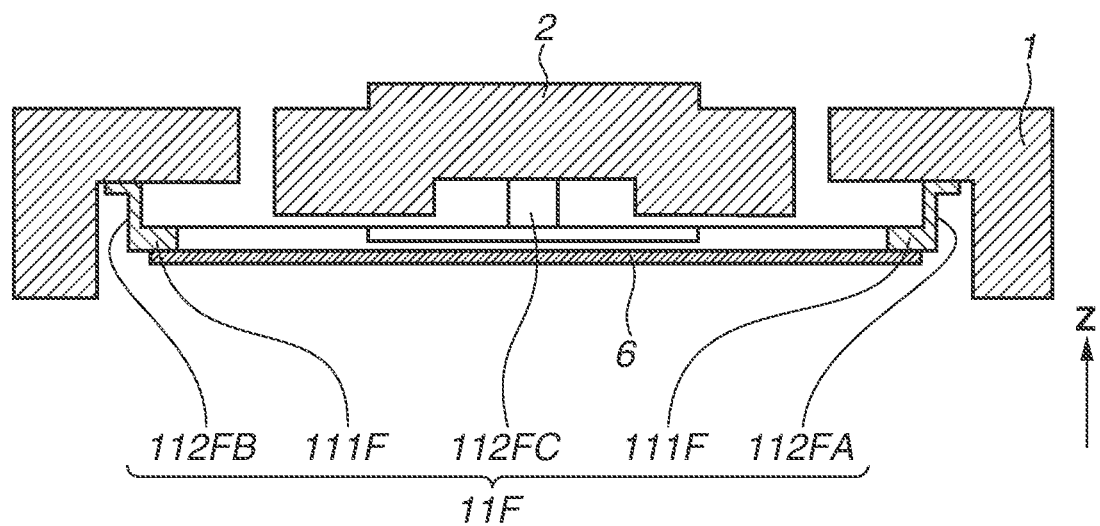
Figure 15:
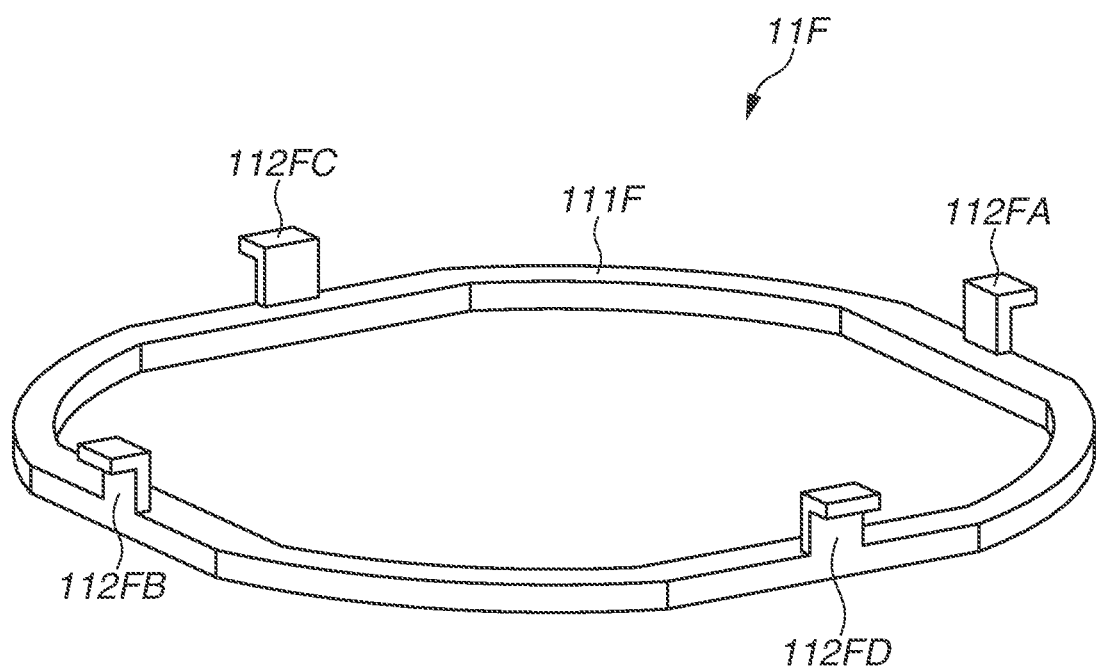
FIG. 15 is a perspective view illustrating an intermediate member (interposed member) according to the sixth embodiment.

FIG. 14A is a perspective view illustrating a schematic configuration of a force sensor 100G according to a sixth embodiment as seen from above. FIG. 14B is a sectional view of the schematic configuration of the force sensor 100G, taken along the line B-B illustrated in FIG. 14A. FIG. 15 is a perspective view of an intermediate member 11F (interposed member).

In the force sensor 100G, the intermediate member 11F (interposed member) is fixed to an outer ring portion 1 (base portion). A circuit board 6 (board) is located below the intermediate member 11F (interposed member) and fixed to the intermediate member 11F (interposed member) at arm portions 112FA, 112FB, 112FC, and 112FD (extending portions).

The intermediate member 11F (interposed member) is not limited to any particular material. To reduce the effect of temperature changes on output, it is suitable that the interposed member has a coefficient of thermal expansion less than that of the displacement portion and greater than that of the board. The effect of temperature changes on the output can be further reduced by making the intermediate member 11F (interposed member) out of a material with a coefficient of thermal expansion closer to that of the material of the circuit board 6 (board) than to that of the material of the strain body 5. In other words, it is suitable that the intermediate member 11F (interposed member) is made of a material with a coefficient of thermal expansion closer to that of the material of the circuit board 6 (board).

The intermediate member 11F (interposed member) includes a bottom portion 111F and the arm portions 112FA, 112FB, 112FC, and 112FD (extending portions). The extending portions have a flat spring structure with a higher modulus of elasticity in a first direction to be described below than in a second direction to be described below.

The arm portions 112FA, 112FB, 112FC, and 112FD (extending portions) are fixed to one of the outer ring portion 1 (base portion) and the circuit board 6 (board). A second surface of the bottom portion 111F to be described below is fixed to the other of the outer ring portion 1 (base portion) and the circuit board 6 (board). Here, the circuit board 6 (board) is fixed to the intermediate member 11F (interposed member) at the second surface opposite to a first surface of the bottom portion 111F from which the arm portions 112FA, 112FB, 112FC, and 112FD (extending portions) extend. The intermediate member 11F (interposed member) is fixed to the outer ring portion 1 (base portion) of the strain body 5 (first member) at the arm portions 112FA, 112FB, 112FC, and 112FD (extending portions). Here, the arm portions 112FA, 112FB, 112FC, and 112FD (extending portions) extend in a direction (second direction) intersecting the moving directions (position measurement directions, first directions) of the detection targets 4A, 4B, 4C, 4D, 4E, 4F, 4G, and 4H.

The arm portions 112FA, 112FB, 112FC, and 112FD (extending portions) each have a part where the thickness in the radial direction (first direction) is smaller (thinner) than those in two directions orthogonal to the radial direction (with the X direction as the radial direction, the Y and Z directions). Take the arm portion 112FA as an example. The arm portion 112FA has a part where the dimension (thickness) in the X direction in the diagram is smaller (thinner) than those in the Y and Z directions (directions orthogonal to the X direction) in the diagram.

According to the present embodiment (sixth embodiment), with changes in the temperature of the force sensor 100G, the thermal stress occurring at the junction between the intermediate member 11F (interposed member) and the circuit board 6 (board) is small as compared with the case where the circuit board 6 (board) is directly fixed to the strain body 5. Moreover, thermal stress at the junctions due to a difference between the coefficients of thermal expansion of the intermediate member 11B (interposed member) and the strain body 5 is reduced by deformation of the arm portions 112FA, 1121-B, 112FC, and 112FD (extending portions). That results in reduction in deformation of the circuit board 6 (board) different from simple thermal expansion. Moreover, that configuration provides a force sensor less susceptible to the effect of temperature changes on output.

Figure 16A:
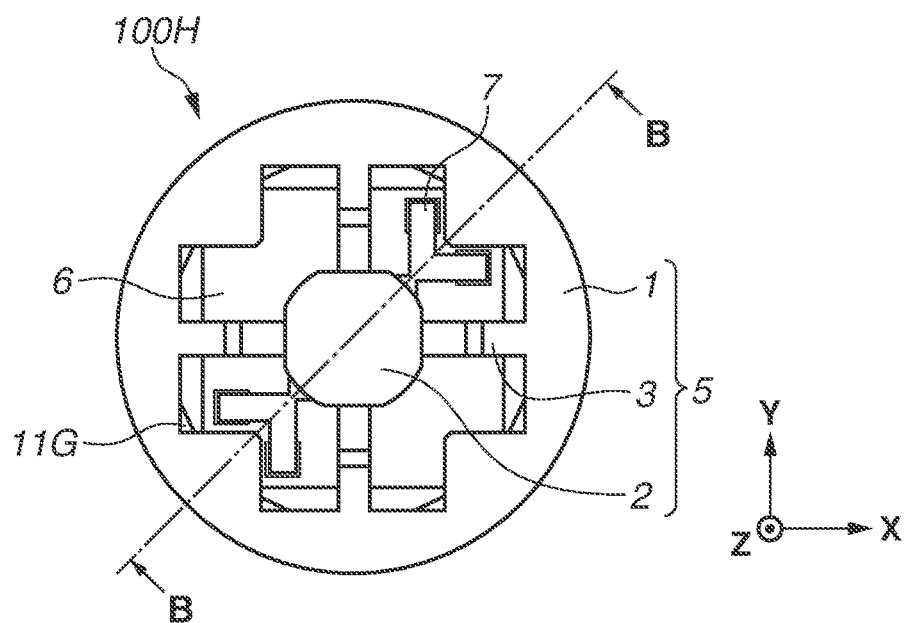
FIGS. 16A and 16B are a perspective view from above and a sectional view, respectively, illustrating a schematic configuration of a force sensor according to a seventh embodiment.
Figure 16B:
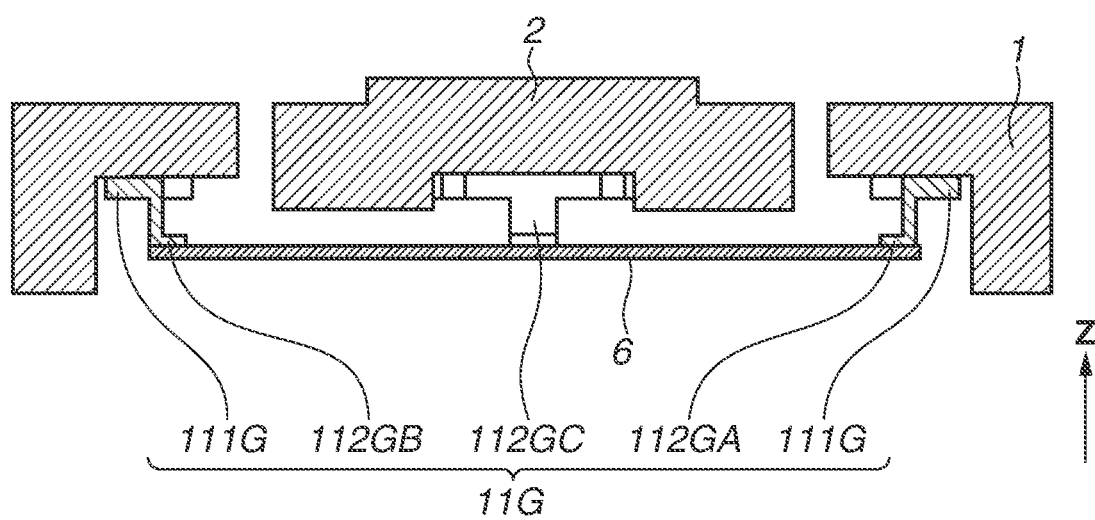

FIG. 16A is a perspective view illustrating a schematic configuration of a force sensor 100H according to a seventh embodiment as seen from above. FIG. 16B is a sectional view of the schematic configuration of the force sensor 100H, taken along the line B-B illustrated in FIG. 16A. The force sensor 100H has a substantially similar configuration to that of the force sensor 100G, whereas its intermediate member 11G (interposed member) is configured differently from the intermediate member 11F (interposed member).

Figure 17:
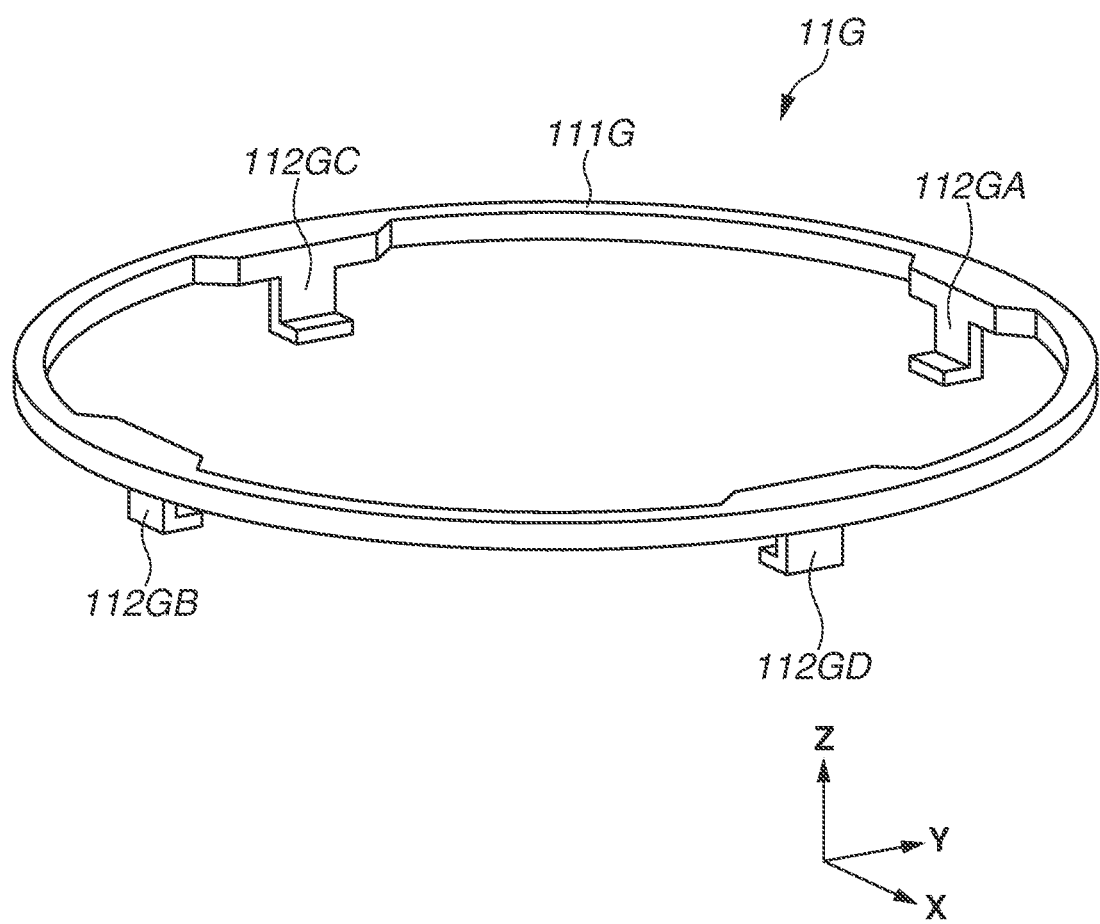
FIG. 17 is a perspective view illustrating an intermediate member (interposed member) according to the seventh embodiment.

FIG. 17 is a perspective view of the intermediate member 11G (interposed member). The intermediate member 11G (interposed member) may be made of any material, without particular limitation in the coefficient of thermal expansion.

The intermediate member 11G (interposed member) includes a bottom portion 111G and arm portions 112GA, 112GB, 112GC, and 112GD (extending portions). The extending portions have a flat spring structure with a higher modulus of elasticity in a first direction to be described below than in a second direction to be described below.

The arms 112GA, 112GB, 112GC, and 112GD (extending portions) are fixed to one of an outer ring portion 1 (base portion) and a circuit board 6 (board). A second surface of the bottom portion 111G to be described below is fixed to the other of the outer ring portion 1 (base portion) and the circuit board 6 (board). Here, the circuit board 6 (board) is fixed to the intermediate member 11G (interposed member) at the arm portions 112GA, 112GB, 112GC, and 112GD (extending portions). The intermediate member 11G (interposed member) is fixed to the outer ring portion 1 (base portion) of the strain body 5 at the second surface opposite to a first surface of the bottom portion 111G from which the arm portions 112GA, 112GB, 112GC, and 112GD (extending portions) extend. Here, the arm portions 112GA, 112GB, 112GC, and 112GD (extending portions) extend in a direction (second direction) intersecting the moving directions (position measurement directions, first directions) of the detection targets 4A, 4B, 4C, 4D, 4E, 4F, 4G, and 4H.

The arm portions 112GA, 112GB, 112GC, and 112GD (extending portions) each have a part where the thickness in the radial direction (first direction) is smaller (thinner) than those in two directions orthogonal to the radial direction (with the X direction as the radial direction, the Y and Z directions). Take the arm portion 112GA as an example. The arm portion 112GA has a part where the dimension (thickness) in the X direction in the diagram is smaller (thinner) than those in the Y and Z directions (directions orthogonal to the X direction) in the diagram.

In the present embodiment, thermal stress at the junctions due to a difference between the coefficients of thermal expansion of the intermediate member 11G (interposed member) and the circuit board 6 (board) is reduced by deformation of the arm portions 112GA, 112GB, 112GC, and 112GD (extending portions). That results in reduction in the effect of temperature changes on a change in output.

Figure 18:
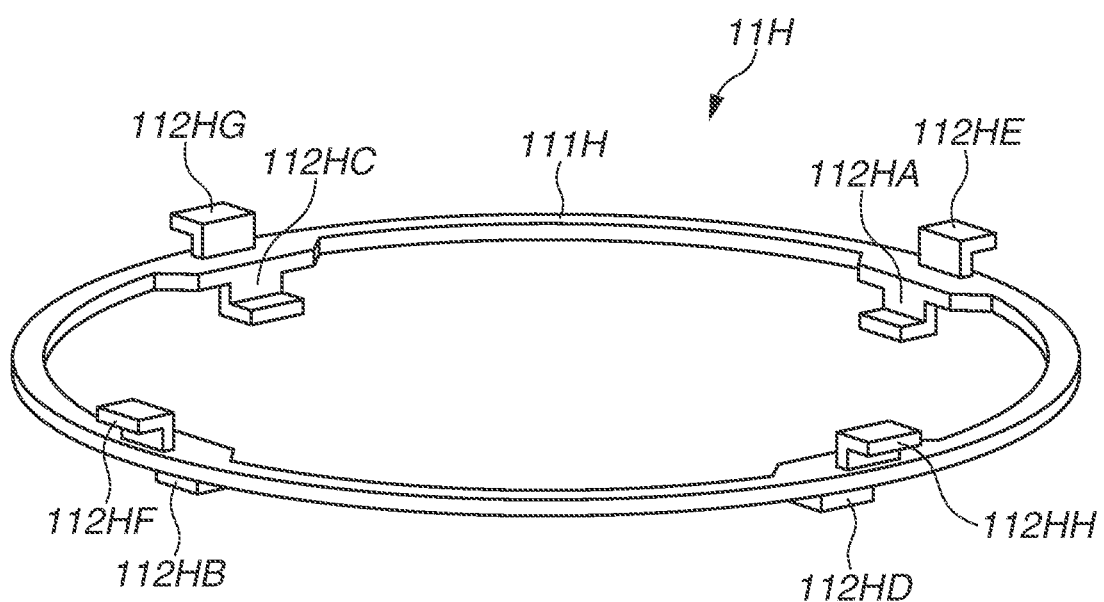
FIG. 18 is a perspective view illustrating another mode of the intermediate member (interposed member) according to the seventh embodiment.

FIG. 18 is a diagram illustrating another mode of the intermediate member (interposed member) according to the present embodiment (seventh embodiment).

An intermediate member 11H (interposed member) includes a bottom portion 111H and arm portions 112HA, 112HB, 112HC, 112HD, 112HE, 112HF, 112HG, and 112HH (extending portions). The extending portions have a flat spring structure with a higher modulus of elasticity in a first direction to be described below than in a second direction to be described below.

The arm portions 112HA, 112HB, 112HC, 112HD, 112HE, 112HF, 112HG, and 112HH (extending portions) each have a part where the thickness in the radial direction (first direction) is smaller than those in two directions orthogonal to the radial direction (with the X direction as the radial direction, the Y and Z directions).

The arm portions 112HA to 112HD (extending portions) are fixed to one of the outer ring portion 1 (base portion) and the circuit board 6 (board). The arm portions 112HE to 112HH (extending portions) are fixed to the other of the outer ring portion 1 (base portion) and the circuit board 6 (board). Here, the circuit board 6 (board) is fixed to the intermediate member 11H (interposed member) at the arm portions 112HA, 112HB, 112HC, and 112HD (extending portions). The intermediate member 11H (interposed member) is fixed to the outer ring portion 1 (base portion) of the strain body 5 at the arm portions 112HE, 112HF, 112HG, and 112HH (extending portions). Here, the arm portions 112HA, 112HB, 112HC, 112HD, 112HE, 112HF, 112HG, and 112HH (extending portions) extend in a direction (second direction) intersecting the moving directions (position measurement directions, first directions) of the detection targets 4A, 4B, 4C, 4D, 4E, 4F, 4G, and 4H.

In addition to the foregoing effect, thermal stress at the junctions between the strain body 5 and the intermediate member 11H (interposed member) is reduced by deformation of the arm portions 112HE, 112HF, 112HG, and 112HH (extending portions) during a temperature change. That results in more reduction in deformation of the circuit board 6 (board) different from simple thermal expansion. That configuration reduces the effect of temperature changes on output further.

The intermediate member (interposed member) described in the present embodiment (seventh embodiment) is not limited to any particular material. To reduce the effect of temperature changes on output, it is suitable that the interposed member desirably has a coefficient of thermal expansion less than that of the displacement portion and greater than that of the board. The effect of temperature changes on the output can be further reduced by making the intermediate member (interposed member) out of a material with a coefficient of thermal expansion closer to that of the material of the circuit board 6 (board) than to that of the material of the strain body 5.

Figure 19:
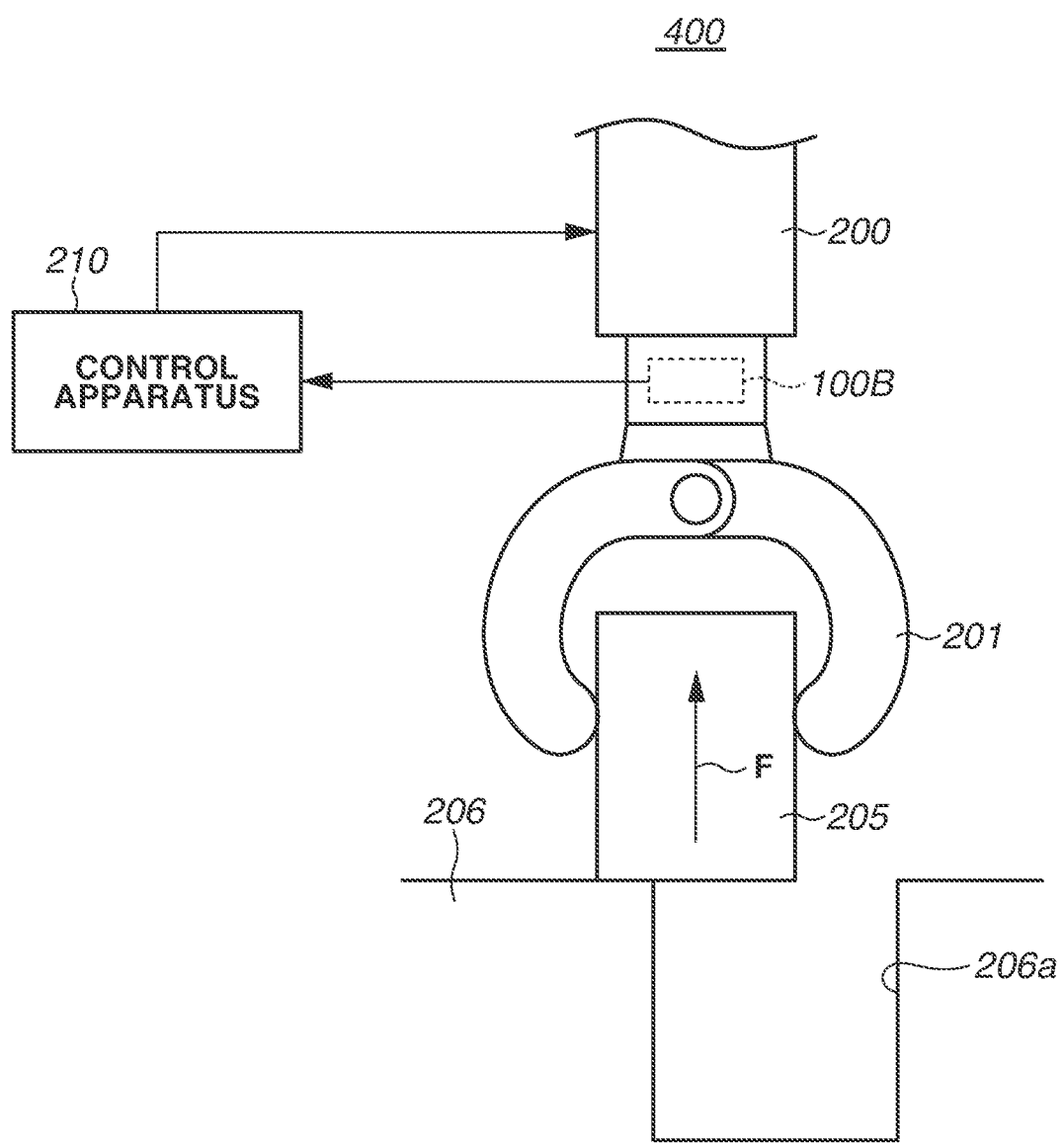
FIG. 19 is a side view illustrating a schematic configuration of a conveyance apparatus according to an eighth embodiment.

An eighth embodiment will be described. A conveyance apparatus including the force sensor 100B described in the second embodiment will be described here. The conveyance apparatus may include force sensors described in the other embodiments instead. FIG. 19 is a side view illustrating a schematic configuration of a conveyance apparatus 400. The conveyance apparatus 400 includes a robot arm 200 (movable unit), the force sensor 100B, a gripping unit 201 (movable unit), and a control apparatus 210 (control unit).

The robot arm 200 (movable unit) is coupled with another not-illustrated robot arm. The robot arm 200 is one of the movable units that can move between predetermined positions. The gripping unit 201 (movable unit) is one of the movable units that can grip an object to be conveyed 205 in a closing operation and release the gripped object to be conveyed 205 in an opening operation. Here, the conveyance apparatus 400 operates such that the gripping unit 201 (movable unit) grips the object to be conveyed 205 at a predetermined position and inserts the gripped object to be conveyed 205 into a hole 206a formed in a base 206. The operation is controlled by the control apparatus 210 (control unit).

The force sensor 100B located between the robot arm 200 (movable unit) and the gripping unit 201 (movable unit) detects an upward external force F that the gripping unit 201 (movable unit) receives from the base 206 via the object to be conveyed 205. For example, if the object to be conveyed 205 is in contact with the top surface of the base 206 other than the hole 206a, some external force acts on the force sensor 100B from the gripping unit 201 (movable unit). The position of the object to be conveyed 205 is thereby detected to be different from that of the hole 206a.

The control apparatus 210 (control unit) then controls the operation of the robot arm 200 (movable unit) to move the object to be conveyed 205 along the top surface of the base 206. When the object to be conveyed 205 is located over the hole 206a, the external force acting on the force sensor 100B via the gripping unit 201 (movable unit) disappears. It is thereby detected that the position of the object to be conveyed 206 is now at the hole 206a. The control apparatus 210 (control unit) controls the operation of the robot arm 200 (movable unit) to put the object to be conveyed 205 into the hole 206a, and then controls the gripping unit 201 (movable unit) to release the object to be conveyed 205.

In such a manner, the force sensor 100B allows the conveyance apparatus 400 to control the operation of the robot arm 200 (movable unit) with high precision.

The force sensors according to the foregoing embodiments of the present invention can also be used in various other mechanical apparatuses than the conveyance apparatus 400 that control operation using results of detection of external force.

Up to this point, the embodiments of the present invention have been described in detail. However, the present invention is not limited to these specific embodiments, and various modes not departing from the gist of the invention are also covered by the present invention. The foregoing embodiments are just some of the embodiments of the present invention, and the embodiments may be combined as appropriate.

According to an embodiment of the present invention, a force sensor is provided that can reduce the change in output (detection value) due to thermal stress.

While the present invention has been described with reference to embodiments, it is to be understood that the invention is not limited to the disclosed embodiments but is defined by the scope of the following claims.

This application claims the benefit of Japanese Patent Application No. 2021-080612, filed May 11, 2021, which is hereby incorporated by reference herein in its entirety.

What is claimed is:

1. A force sensor comprising:
a strain body including a base portion, a displacement portion configured to make a displacement relative to the base portion under external force, and an elastic connection portion configured to elastically connect the base portion and the displacement portion;
a board including a detection unit configured to detect the displacement of the displacement portion relative to the base portion in a first direction; and
an interposed member interposed between the strain body and the board, the interposed member including an extending portion extending in a second direction intersecting a surface of the board and the first direction,
wherein the extending portion has a flat spring structure having a higher modulus of elasticity in the first direction than in the second direction.

2. The force sensor according to claim 1,
wherein the interposed member includes the extending portion and a bottom portion having a first surface from which the extending portion extends and a second surface opposite to the first surface,
wherein the extending portion is fixed to one of the displacement portion and the board, and
wherein the second surface is fixed to the other of the displacement portion and the board.

3. The force sensor according to claim 1, wherein the interposed member has a coefficient of thermal expansion less than a coefficient of thermal expansion of the displacement portion and greater than a coefficient of thermal expansion of the board.

4. The force sensor according to claim 3, wherein the coefficient of thermal expansion of the interposed member is closer to the coefficient of thermal expansion of the board than to the coefficient of thermal expansion of the displacement portion.

5. The force sensor according to claim 1,
wherein the interposed member includes the extending portion, and a bottom portion having a first surface from which the extending portion extends and a second surface opposite to the first surface,
wherein the extending portion is fixed to one of the base portion and the board, and
wherein the second surface is fixed to the other of the base portion and the board.

6. The force sensor according to claim 5, wherein the interposed member has a coefficient of thermal expansion less than a coefficient of thermal expansion of the base portion and greater than a coefficient of thermal expansion of the board.

7. The force sensor according to claim 6, wherein the coefficient of thermal expansion of the interposed member is closer to the coefficient of thermal expansion of the board than to the coefficient of thermal expansion of the base portion.

8. The force sensor according to claim 5, wherein a thickness of the extending portion in the first direction is smaller than a thickness in a direction orthogonal to the first direction.

9. A robot comprising:
a movable unit;
the force sensor according to claim 5; and
a control unit configured to control operation of the movable unit based on an output from the force sensor.

10. A robot comprising:
a movable unit;
the force sensor according to claim 1; and
a control unit configured to control operation of the movable unit based on an output from the force sensor.

11. A force sensor comprising:
a strain body including a base portion, a displacement portion configured to make a displacement relative to the base portion under external force, and an elastic connection portion configured to elastically connect the base portion and the displacement portion;
a board including a detection unit configured to detect the displacement of the displacement portion relative to the base portion in a first direction; and
an interposed member interposed between the strain body and the board, the interposed member including an extending portion extending in a second direction intersecting a surface of the board and the first direction,
wherein the interposed member includes a first extending portion serving as the extending portion, a second extending portion extending in a third direction intersecting the surface of the board and the first direction, the third direction being different from the second direction, and a bottom portion having a first surface from which the first extending portion extends and a second surface from which the second extending portion extends, the second surface being opposite to the first surface,
wherein the first extending portion is fixed to one of the displacement portion and the board, and
wherein the second extending portion is fixed to the other of the displacement portion and the board.

12. The force sensor according to claim 11, wherein the second extending portion has a flat spring structure having a higher modulus of elasticity in the first direction than in the second direction.

13. A force sensor comprising:
a strain body including a base portion, a displacement portion configured to make a displacement relative to the base portion under external force, and an elastic connection portion configured to elastically connect the base portion and the displacement portion;

a board including a detection unit configured to detect the displacement of the displacement portion relative to the base portion in a first direction; and an interposed member interposed between the strain body and the board, the interposed member including an extending portion extending in a second direction intersecting a surface of the board and the first direction, wherein the interposed member including a first extending portion serving as the extending portion, a second extending portion extending in a third direction intersecting the surface of the board and the first direction, the third direction being different from the second direction, and a bottom portion having a first surface from which the first extending portion extends and a second surface from which the second extending portion extends, the second surface being opposite to the first surface, wherein the first extending portion is fixed to one of the base portion and the board, and wherein the second extending portion is fixed to the other of the base portion and the board.

14. The force sensor according to claim 13, wherein the second extending portion has a flat spring structure having a higher modulus of electricity in the first direction than in the second direction.

15. The force sensor according to claim 13, wherein a thickness of the first extending portion in the first direction and a thickness of the second extending portion in the first direction each are smaller than a thickness in a direction orthogonal to the corresponding first direction.

16. A robot comprising:
a movable unit;
the force sensor according to claim 13; and
a control unit configured to control operation of the movable unit based on an output from the force sensor.

17. A force sensor comprising:
a strain body including a base portion, a displacement portion configured to make a displacement relative to the base portion under external force, and an elastic connection portion configured to elastically connect the base portion and the displacement portion;

a board including a detection unit configured to detect the displacement of the displacement portion relative to the base portion in a first direction; and an interposed member interposed between the strain body and the board, the interposed member including an extending portion extending in a second direction intersecting a surface of the board and the first direction, wherein a thickness of the extending portion in the first direction is smaller than a thickness in a direction orthogonal to the first direction.

* * * * *